United States Patent
Haque et al.

(10) Patent No.: US 11,828,161 B2
(45) Date of Patent: Nov. 28, 2023

(54) DOWNHOLE COUPON HOLDER

(71) Applicant: ARAMCO SERVICES COMPANY, Houston, TX (US)

(72) Inventors: Mohammad H. Haque, Katy, TX (US); Rajesh K. Saini, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 455 days.

(21) Appl. No.: 17/155,735

(22) Filed: Jan. 22, 2021

(65) Prior Publication Data
US 2022/0235647 A1 Jul. 28, 2022

(51) Int. Cl.
  *E21B 47/01* (2012.01)
  *G01N 17/04* (2006.01)
  *E21B 17/042* (2006.01)

(52) U.S. Cl.
  CPC .......... *E21B 47/01* (2013.01); *E21B 17/0426* (2013.01); *G01N 17/046* (2013.01)

(58) Field of Classification Search
  CPC .... E21B 47/01; E21B 17/0426; G01N 17/046
  See application file for complete search history.

(56) References Cited

U.S. PATENT DOCUMENTS

| | | |
|---|---|---|
| 2,964,723 A | 12/1960 | Schaschl et al. |
| 2,994,219 A | 8/1961 | Schaschl |
| 3,098,801 A | 7/1963 | Marsh et al. |
| 4,179,920 A | 12/1979 | Schuller et al. |
| 4,688,638 A | 8/1987 | Williams |

(Continued)

FOREIGN PATENT DOCUMENTS

| | | |
|---|---|---|
| RU | 182545 U1 | 8/2018 |
| WO | 2009015318 A1 | 1/2009 |

(Continued)

OTHER PUBLICATIONS

International Search Report and Written Opinion of the International Searching Authority issued in corresponding International Application No. PCT/US2022/013303, dated Apr. 19, 2022 (12 pages).

(Continued)

*Primary Examiner* — D. Andrews
(74) *Attorney, Agent, or Firm* — Osha Bergman Watanabe & Burton LLP

(57) ABSTRACT

A first type of coupon holder includes an elongated core that is axially aligned with a coupon holder axis and an external surface that circumscribes the elongated core. The external surface defines coupon mounting surfaces with different radial orientations relative to the coupon holder axis. The coupon mounting surfaces are circumferentially aligned around the elongated core and have geometric centers with the same axial position along the coupon holder axis. A second type of coupon holder includes an elongated support structure that is axially aligned with a coupon holder axis and a coupon holder body positioned to have an end face in a plane transverse to the coupon holder axis. The coupon holder body has a plurality of slots to receive end portions of coupons. The slots are in a circular arrangement around the coupon holder axis and position coupons in parallel to the coupon holder axis.

5 Claims, 16 Drawing Sheets

(56) References Cited

U.S. PATENT DOCUMENTS

| | | | |
|---|---|---|---|
| 4,697,465 A | | 10/1987 | Evans et al. |
| 4,928,760 A | | 5/1990 | Freitas |
| 4,945,758 A | | 8/1990 | Carpenter |
| 5,095,977 A | | 3/1992 | Ford |
| 5,627,749 A | * | 5/1997 | Waterman ............... E21B 47/26 |
| | | | 73/152.01 |
| 5,814,982 A | | 9/1998 | Thompson et al. |
| 7,096,721 B2 | | 8/2006 | Bennett |
| 8,261,601 B2 | | 9/2012 | Stolle et al. |
| 10,246,997 B2 | | 4/2019 | Serres et al. |
| 2002/0121370 A1 | | 9/2002 | Kurkjian et al. |
| 2012/0074969 A1 | | 3/2012 | Snelling et al. |
| 2015/0167458 A1 | | 6/2015 | Harms et al. |
| 2017/0226843 A1 | * | 8/2017 | Jovancicevic ....... G01N 17/046 |
| 2018/0024044 A1 | * | 1/2018 | Ringgenberg .......... E21B 47/00 |
| | | | 73/86 |
| 2019/0112911 A1 | | 4/2019 | Jovancicevic et al. |
| 2021/0262918 A1 | * | 8/2021 | Nicolino ............. E21B 17/1071 |

FOREIGN PATENT DOCUMENTS

| | | |
|---|---|---|
| WO | 2016/153522 A1 | 9/2016 |
| WO | 2020032795 A1 | 2/2020 |
| WO | 2021/007182 A1 | 1/2021 |

OTHER PUBLICATIONS

Hamid, Syed et al., "A Practical Method of Predicting Chemical Scale Formation in Well Completions"; Proceedings of the SPE Asia Pacific Oil and Gas Conference and Exhibition; Paper No. SPE-166673-MS; pp. 1-20; Oct. 22, 2013 (20 pages).

* cited by examiner

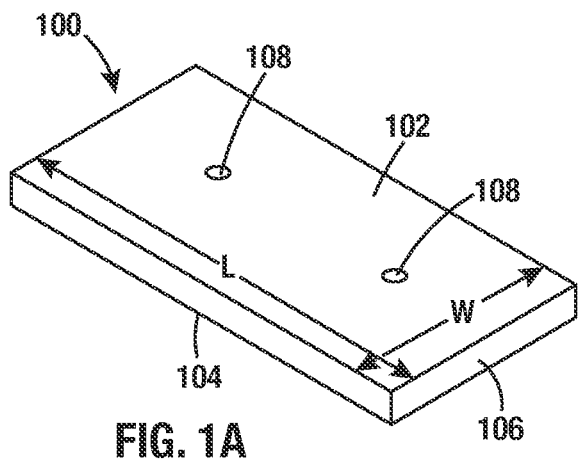
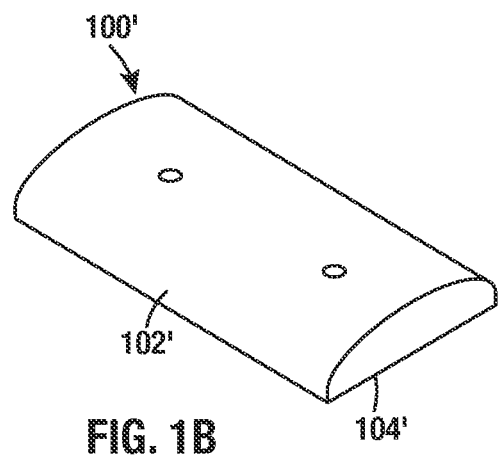
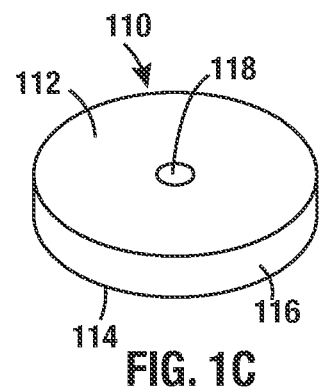
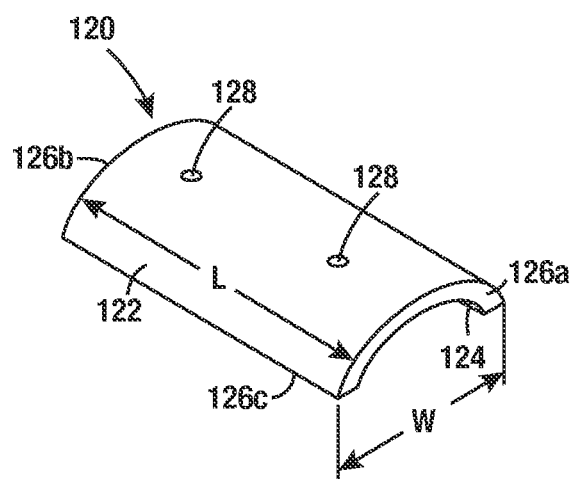

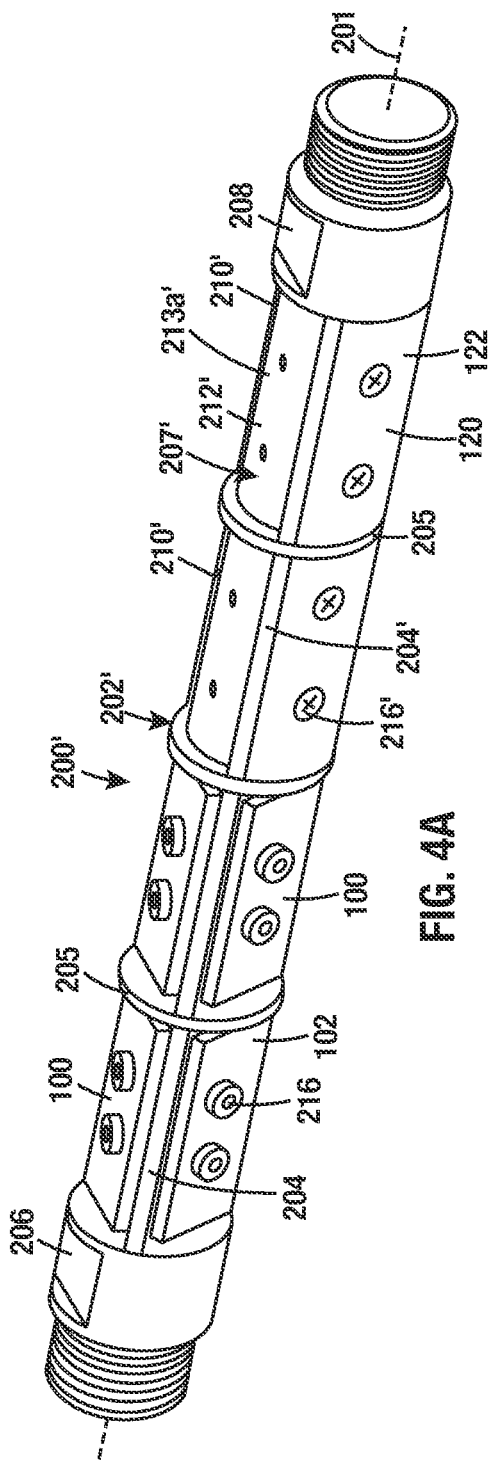
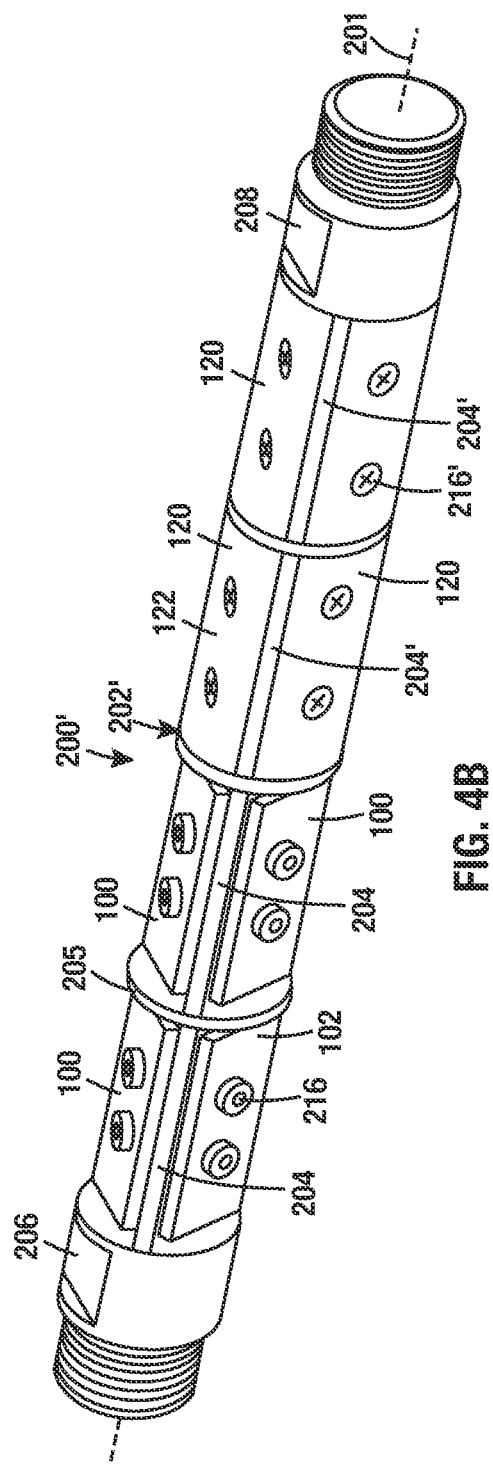

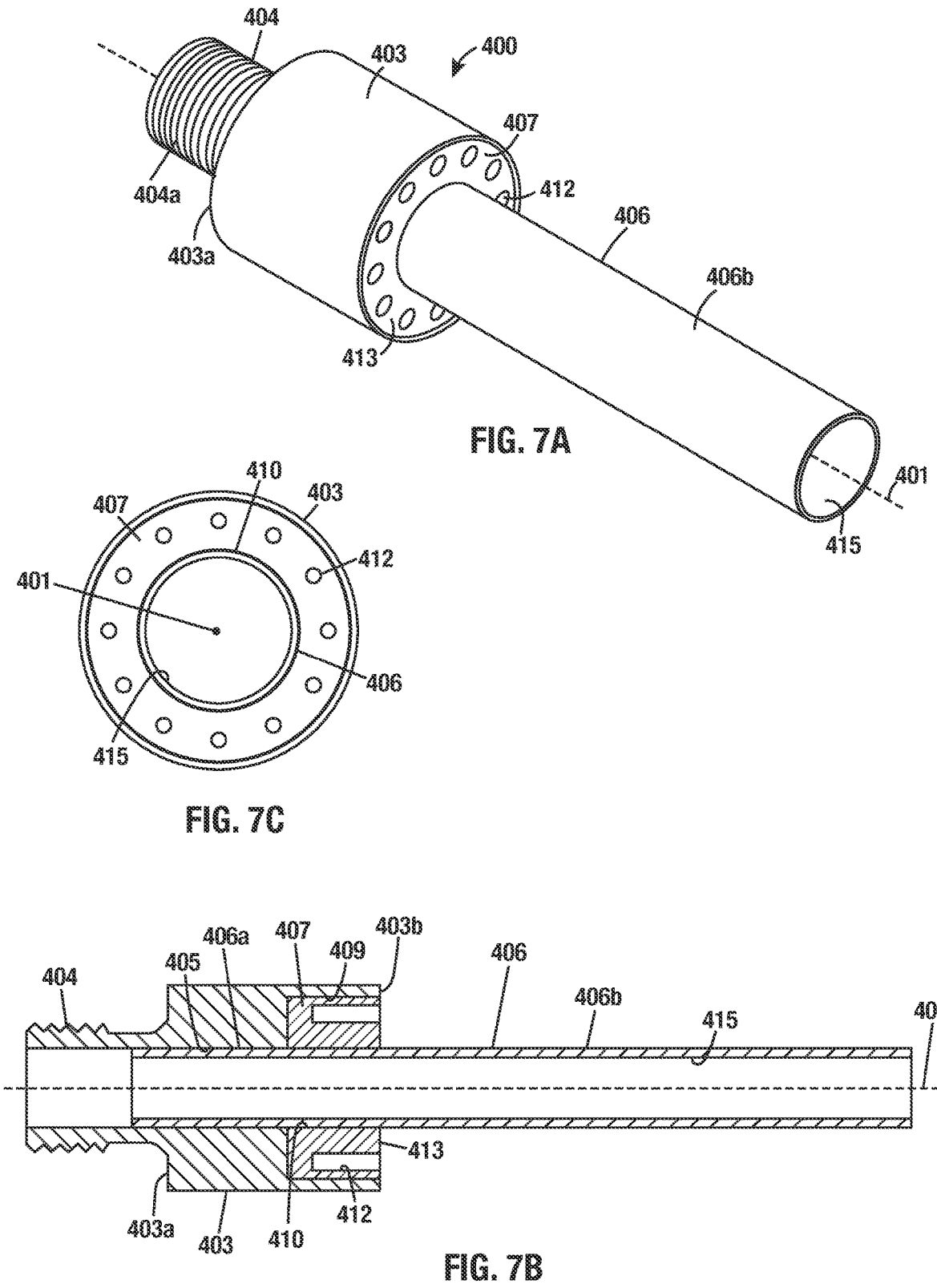

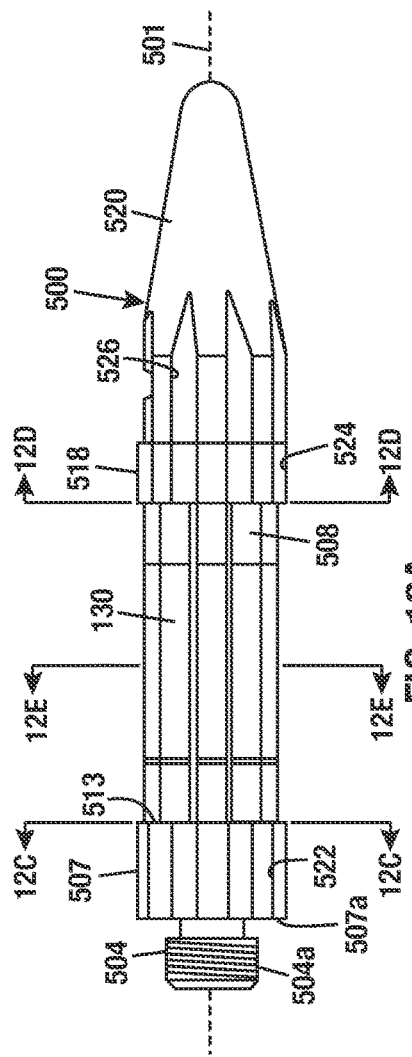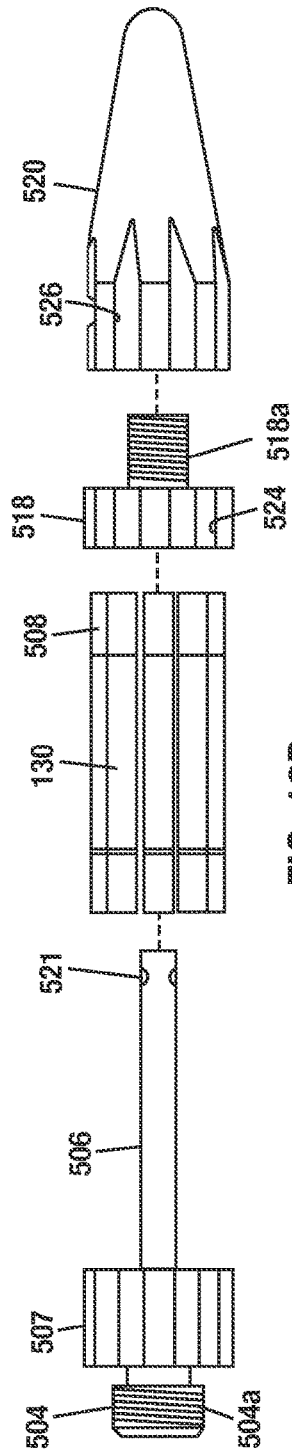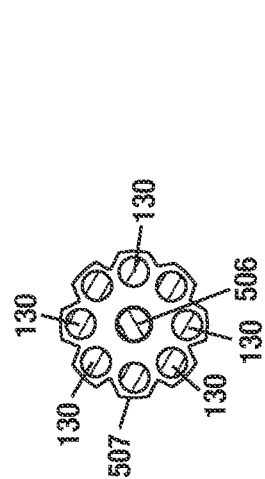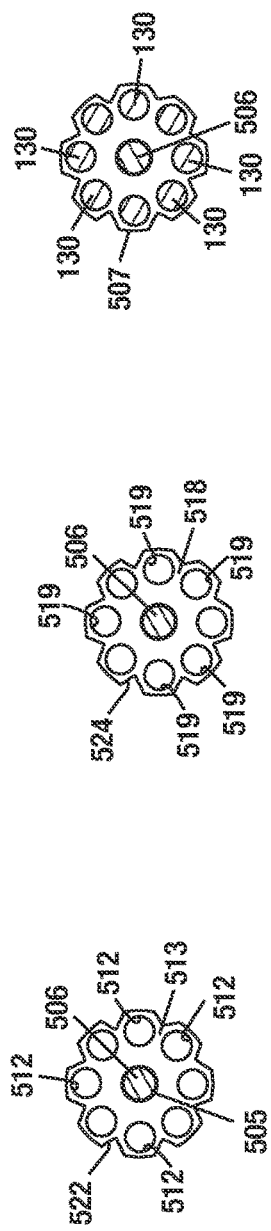

DOWNHOLE COUPON HOLDER

BACKGROUND

Coupon tests are used in the oilfield to assess the nature and degree of corrosion, erosion, and scale damage of materials intended for use in making a wellbore tubular or other metallic component to be deployed into a wellbore. Coupons are specimens of the materials of interest. In tests, coupons are characterized when pristine and after a predetermined deployment period in a wellbore environment.

Coupons are supported in coupon holders for deployment into the wellbore. Traditionally, a coupon holder that can accommodate multiple coupons includes multiple perforated tubes that are capped and connected end to end, each perforated tube typically containing one coupon. One of the challenges with the traditional coupon holder is that each addition of a coupon demands lengthening the coupon holder. A traditional coupon holder could be three to five feet long to hold three to five coupons. In some cases, there may be a limitation on the length of the coupon holder, which will limit the number of coupons that can be deployed into the well at any given time and the number of tests. A single deployment period could be three to six months. As such, limiting the number of coupons that could be deployed to a small number may result in significant delays in testing, validating, and certifying materials. Another challenge when multiple coupons are carried by the traditional coupon holder is that the coupons are arranged end to end along an axial axis of the holder, which means that the coupons will be at different positions along the axial axis of the holder. In this case, the coupons may experience different flow regimes or conditions since the coupons will be at different depths within the wellbore. In some cases, the perforated tubes alter the true nature of the hydrodynamic flow profile, especially at the edges of the perforations and open channels within the tube, so that the coupons do not experience the actual dynamic flow in the wellbore.

SUMMARY

In a first summary example, a coupon holder includes an elongated body having opposed first and second ends and one or more coupon holder unit disposed between the opposed first and second ends. Each coupon holder unit includes a coupon holder body, which has an elongated core and an external surface circumscribing the elongated core. The elongated core is axially aligned with a coupon holder axis. The external surface defines a plurality of coupon mounting surfaces with different radial orientations relative to the coupon holder axis. The plurality of coupon mounting surfaces are circumferentially aligned around the elongated core and have geometric centers with the same axial position along the coupon holder axis. In certain cases, a plurality of slots may be formed in the external surface. The base walls of the plurality of slots may define the plurality of coupon mounting surfaces. Alternatively, a plurality of facets may be formed on the external surface. The plurality of facets may define the plurality of coupon mounting surfaces. In certain cases, the plurality of mounting surfaces may be selected from planar surfaces and curved surfaces. In certain cases, the plurality of mounting surfaces may have a rectangular shape. In certain cases, a first end connection may be coupled to the first end of the elongated body, and a second end connection may be coupled to the second end of the elongated body. Each of the first end connection and the second end connection may include a threaded surface for forming a threaded connection. Alternatively, an end connection may be coupled to the first end of the elongated body, and an end fitting may be coupled to the second end of the elongated body. The end connection may include a threaded surface for forming a threaded connection, and the end fitting may have a bull nose shape. In certain cases, the elongated core may be a hollow core. Alternatively, the elongated core may be a solid core. In certain cases, the elongated body may include a plurality of the coupon holder units coupled in series between the first and second ends of the elongated body. In certain cases, a partition wall may be disposed between each adjacent pair of coupon holder units. In certain cases, the coupon holder body of each coupon holder unit may be made of a metallic material.

In a second summary example, a coupon assembly includes the coupon holder as described in the first summary example and a plurality of coupons having back surfaces in mating contact with the plurality of coupon mounting surfaces of at least one of the coupon holder units of the coupon holder. The coupons are fastened to the coupon body of the respective coupon holder unit. In certain cases, the back surfaces of the coupons in mating contact with the coupon mating surfaces may be coated with a corrosion-resistant material. In certain cases, the coupons may be selected from planar coupons, plano-curved coupons, and curved coupons. In certain cases, each of the coupons may be selected from a corrosion coupon, an erosion coupon, and a scale coupon.

In a third summary example, a coupon holder includes an elongated support structure that is axially aligned with a coupon holder axis and a coupon holder body that is positioned to have an end face in a plane that is transverse to the coupon holder axis. The coupon holder body has a plurality of slots disposed in a circular arrangement around the coupon holder axis. The plurality of slots have open ends on the end face. The plurality of slots receive end portions of a plurality of coupons through the open ends and position the plurality of coupons in parallel to the coupon holder axis and around the elongated support structure. In certain cases, the plurality of slots may include cylindrical slots to receive end portions of cylindrical rod coupons. Alternatively, the plurality of slots may include flat-sided slots to receive end portions of flat rod coupons. Alternatively, the plurality of slots may include curved slots to receive end portions of curved coupons. In certain cases, the plurality of slots may have shapes to receive end portions of at least two different types of coupon shapes selected from flat rod coupon shape, cylindrical rod coupon shape, and curved coupon shape. In certain cases, the coupon holder body may be a ring body having a central opening, and the plurality of slots may be disposed in a circular arrangement around the central opening. In certain cases, the coupon holder may include a coupon holder housing having a bore. The coupon holder body may be disposed within an annular cavity formed within the bore. An end portion of the elongated support structure may extend through the central opening in the coupon holder body into the bore. In certain cases, the coupon holder housing may include a threaded surface for forming a threaded connection. In certain cases, the elongated support structure may be a cylindrical tube. Alternatively, the elongated support structure may be a cylindrical rod. In certain cases, the coupon holder may include an end connection coupled to one end of the coupon holder body and an end fitting coupled to one end of the elongated support structure. The end connection may include a threaded surface for forming a threaded connection, and the end fitting may have a bull nose shape. In certain cases, the coupon holder body and the elongated support structure may be made of a metallic material.

In a fourth summary example, a coupon assembly includes a coupon holder as described in the third summary example and a plurality of coupons having end portions mounted in the plurality of slots of the coupon holder body of the coupon holder. The plurality of coupons are positioned in parallel to the coupon holder axis and around the elongated support structure by the slots. In certain cases, each of the plurality of coupons may be selected from cylindrical rod coupons, flat rod coupons, and curved coupons. In certain cases, each of the coupons may be selected from a corrosion coupon, an erosion coupon, and a scale coupon.

In a fifth summary example, a coupon assembly includes a first coupon holder body that is axially aligned with a coupon holder axis. The first coupon holder body has a first end face in a plane transverse to the coupon holder axis. A plurality of first slots are formed in the first coupon holder body. The plurality of first slots are disposed in a circular arrangement around the coupon holder axis and have first open ends on the first end face. The coupon assembly includes a second coupon holder body having a second end face in a plane transverse to the coupon holder axis. The second end face of the second coupon holder body is positioned in opposing relation to the first end face of the first coupon holder body. A plurality of second slots are formed in the second coupon holder body. The plurality of second slots are disposed in a circular arrangement around the coupon holder axis and have second open ends on the second end face. The coupon assembly includes a plurality of coupons with first end portions mounted in the plurality of first slots and second end portions mounted in the plurality of second slots. The plurality of coupons are positioned in parallel to the coupon holder axis and around the elongated support structure by the first and second slots. In certain cases, the plurality of coupons may be selected from cylindrical rod coupons, flat rod coupons, and curved coupons. In certain cases, each of the coupons may be selected from a corrosion coupon, an erosion coupon, and a scale coupon.

In a sixth summary example, a downhole tool includes a coupon assembly as described in the second summary example or the fourth summary example or the fifth summary example and a downhole corrosion measurement tool coupled to the coupon assembly.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIG. 1A is a perspective view of a planar coupon in a rectangular shape.

FIG. 1B is a perspective view of a planar-curved coupon.

FIG. 1C is a perspective view of a planar coupon in a disk shape.

FIG. 1D is a perspective view of a curved coupon.

FIG. 4A is a perspective view of a partially assembled coupon assembly formed with a downhole coupon holder configured to hold coupons with flat back surfaces and coupons with curved back surface.

FIG. 4B is a perspective view of a fully assembled coupon assembly formed with a downhole coupon holder of FIG. 4A.

FIG. 7A is a perspective view of a downhole coupon holder configured to hold cylindrical rod coupons.

FIG. 7B is a cross-sectional view of the downhole coupon holder of FIG. 7A.

FIG. 7C is an end view of the downhole coupon holder shown in FIGS. 7A and 7B.

FIG. 12A is an elevated view of a coupon assembly formed with a downhole coupon holder that supports coupons around a central rod.

FIG. 12B is an exploded view of the coupon assembly shown in FIG. 12A.

FIG. 12C is a cross-sectional view of FIG. 12A along line 12C-12C.

FIG. 12D is a cross-sectional view of FIG. 12A along line 12D-12D.

FIG. 12E is a cross-sectional view of FIG. 12A along line 12E-12E.

DETAILED DESCRIPTION

Figure 1E:
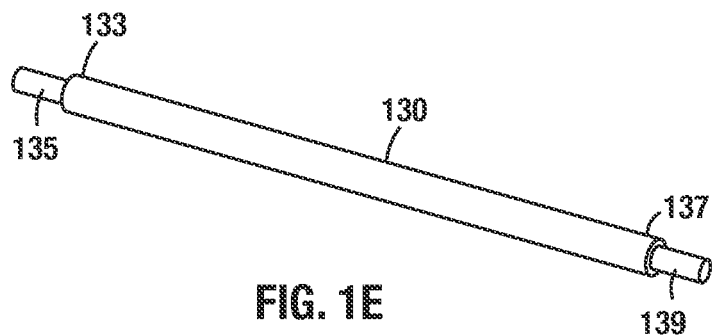
FIG. 1E is a perspective view of a cylindrical rod coupon.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, related well known features or processes have not been shown or described in detail to avoid unnecessarily obscuring the implementations and embodiments. For the sake of continuity, and in the interest of conciseness, same or similar reference characters may be used for same or similar objects in multiple figures.

Coupons of interest herein may be corrosion coupons, erosion coupons, and scale coupons (or deposition coupons). Corrosion coupons provide a qualitative measure of relative corrosion rates of a material in the presence of wellbore fluids, such as hydrocarbons and other substances that could damage a metallic component. Erosion coupons provide a qualitative measure of relative erosion rates of a material in the presence of wellbore fluids. Scale coupons provide a qualitative measure of relative deposition rates of substances on a surface in the presence of wellbore fluids. For coupon testing in a wellbore, the coupons are prepared or treated with the materials of interest. Typically, the coupons are made of metallic materials. Treatment or coatings, such as corrosion inhibitors and performance coatings, applied to the coupons may be metallic or non-metallic. The coupons are pre-weighed and then deployed into the wellbore environment for a predetermined period. After the coupons are removed from the wellbore, they are weighed again to determine material loss or gain and may be subjected to other types of assessments.

Various downhole coupon holders capable of holding multiple coupons, e.g., any combination of corrosion coupons, erosion coupons, and scale coupons, at a given fixed length are described herein. The downhole coupon holders support coupons radially from a coupon holder axis. Several coupons can have the same axial position along the coupon holder axis, allowing the coupons to experience the same dynamic flow when the coupon assembly is deployed in a wellbore. Each downhole coupon holder has the capability to hold a significant number of coupons in a compact size. The downhole coupon holders described herein may hold coupons with the same shape or coupons with mixed shapes. Coupon shapes may be generally classified as planar, curved, or rod. Examples of coupon shapes are illustrated in FIGS. 1A-1F. However, these examples do not constitute an exhaustive list of coupon shapes that could be supported by the downhole coupon holders described herein.

FIG. 1A shows a planar coupon 100 with a front surface 102, a back surface 104, which is in opposing relation to front surface 102, and an edge surface 106 extending between front surface 102 and back surface 104 and around a perimeter of the coupon. Front and back surfaces 102, 104 are planar and parallel to each other. Edge surface 106 may be straight as shown or may be beveled or chamfered in other examples. Front surface 102 is the side of coupon 100 that would face outwards when coupon 100 is mounted on a planar surface of a coupon holder, and back surface 104 is the side of coupon 100 that would mate with the planar surface of the coupon holder. Coupon 100 has fastener holes 108 extending through a thickness of the coupon. Fastener holes 108 have apertures at the front and back surfaces 102, 104 to allow insertion of fasteners, such as bolts or screws, through the coupon. Typically, the number of fastener holes 108 in coupon 100 will match the number of fastener holes in the respective coupon mounting surface of the coupon holder. In the illustrated example of FIG. 1A, front surface 102 and back surface 104 have rectangular shapes. In another example, front surface 102 and back surface 104 may have square shapes. The term "rectangular coupon" may describe both a planar coupon with a rectangular shape and a planar coupon with a square shape since a square is a special case of a rectangle. FIG. 1B shows a variation 100' of the planar coupon including a front surface 102' that is curved and a back surface 104' that is planar, forming a plano-curved coupon. The size of planar coupon 100 or plano-curved coupon 100' will vary with the intended application. One example size is a length (L) in a range from 2.0 to 5.0 inches, a width (W) in a range from 0.5 to 2.0 inches, and a thickness in a range from 0.1 inches to 0.5 inches.

FIG. 1C shows a planar coupon 110 having a front surface 112, a back surface 114, which is in opposing relation to front surface 112, and an edge surface 116 extending between front surface 112 to back surface 114 and around a perimeter of the coupon. Front and back surfaces 112, 114 are planar and parallel to each other. Edge surface 116 may be straight as shown or may be beveled or chamfered in other examples. Front surface 112 is the side of coupon 110 that would face outwards when coupon 110 is mounted on a planar surface of a coupon holder, and back surface 114 is the side of coupon 110 that would mate with the planar surface of the coupon holder. Coupon 110 has a fastener hole 118 extending through a thickness of the coupon. Fastener hole 118 has apertures at front and back surfaces 112, 114 to allow insertion of a fastener, such as a bolt or screw, through the coupon. Coupon 110 may have more than one fastener hole in some cases. In the illustrated example of FIG. 1C, front and back surfaces 112, 114 have circular shapes. In another example, front and back surfaces 112, 114 may have oval shapes. The term "disk coupon" may describe both a planar coupon with a circular shape and a planar coupon with an oval shape. The size of disk coupon 110 will vary with the intended application. One example size is a diameter or width in a range from 0.5 to 2.0 inches and a thickness in a range from 0.1 to 0.5 inches.

FIG. 1D shows a curved coupon 120 having a front surface 122, a back surface 124, which is in opposing relation to the front surface, and edge surfaces 126a, 126c, 126c extending between front surface 122 and back surface 124 and along edges of the coupon. Edge surfaces 126a, 126b are in opposing relation. Front and back surfaces 122, 124 are curved and may have the same radius of curvature. Edge surfaces 116a, 116b, 116c may be straight as shown or may be beveled or chamfered in other examples. Curved coupon 120 may have fastener holes 128 extending through a thickness of the coupon. Fastener holes 128 have apertures at front and back surfaces 122, 124 to allow insertion of fasteners, such as screws or bolts, through the coupon. The number of fastener holes 128 may be dictated by the number of fastener holes in the respective coupon mounting surface or the number of fasteners to ensure a secure connection of the coupon to the coupon mounting surface. The size of the curved coupon will vary with the intended application. One example size is a length of 2 to 6 inches, a width of 0.5 to 2.0 inches, a height of 0.5 to 1.5 inches, and a thickness of 0.1 to 0.5 inches.

It can be difficult to source coupons of desired metallurgy. Even when the metallurgy is available, it is typically in the form of a pipe. Manufacturing coupons with flat surfaces from pipes can be challenging. In this regard, curved coupons may have an advantage over planar coupons, or coupons with a flat back surface, in that curved coupons can be prepared directly from a pipe with the desired metallurgy. For example, a single cut in a plane parallel to the axis of the pipe will create two curved coupons that are ready to use. Another cut, parallel to the pipe axis but 90 degrees offset from the previous cut, would create four coupons that are ready to use. On the other hand, planar coupons, or coupons with a flat back surface, will require that curved sections formed by cutting a pipe are further machined to form flat surface(s).

Figure 1F:
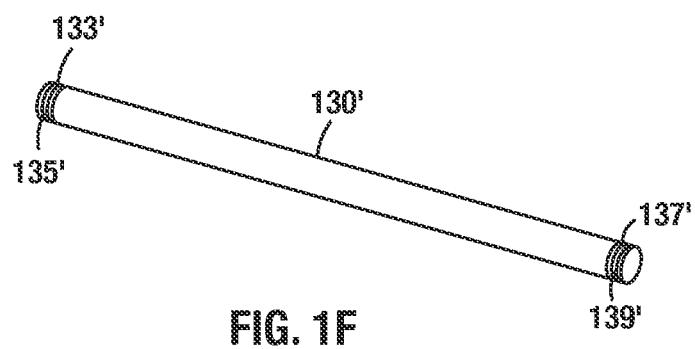
FIG. 1F is a perspective view of another cylindrical rod coupon.

FIG. 1E shows a cylindrical rod coupon 130 having an end portion 133 with a pin 135 that may be inserted in a cylindrical slot of a coupon holder. The other end portion 137 may also include a pin 139 for insertion in a cylindrical slot in a coupon holder. In some cases, pins 135, 139 may be omitted, and end portions 133, 137 may be inserted directly in cylindrical slots in a coupon holder. FIG. 1F shows an alternative cylindrical rod coupon 130' having end portions 133' with threads 135' that may engage threads inside a cylindrical slot of a coupon holder. The other end portion 137' may also have threads 139'. In another example, a cylindrical rod coupon may have threads at one end and a pin at the other end. In yet another example, end portions of a cylindrical rod coupon may have holes to receive fasteners, e.g., in order to enable locking of the cylindrical rod to a coupon holder with fasteners. The size of the cylindrical rod coupon will vary with the intended application. One example is a diameter in a range from 0.1 to 0.5 inches and a length in a range from 2 to 6 inches.

Figure 1G:
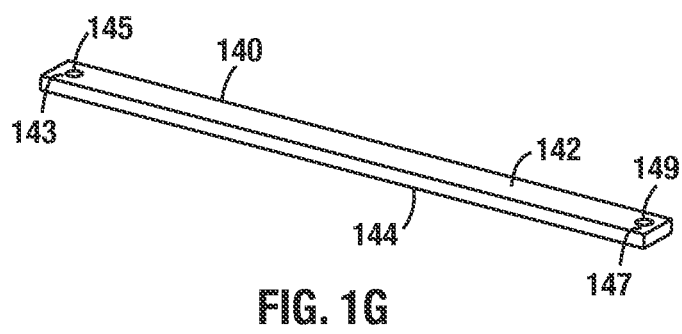
FIG. 1G is a perspective view of a flat rod coupon.

FIG. 1G shows a flat rod coupon 140, i.e., where both sides 142, 144 of the rod are flat. Flat rod coupon 140 has end portions 143, 147 that may be inserted in flat-sided slots of a coupon holder. In some cases, end portions 143, 147 may have holes 145, 149 to receive fasteners that allow the end portions to be locked to the coupon holder. The size of the flat rod coupon will vary with the intended application. One example is a width in a range from 0.1 to 0.5 inches, a thickness in a range from 0.1 to 0.5 inches, and a length in a range from 2 to 6 inches.

Figure 2A:
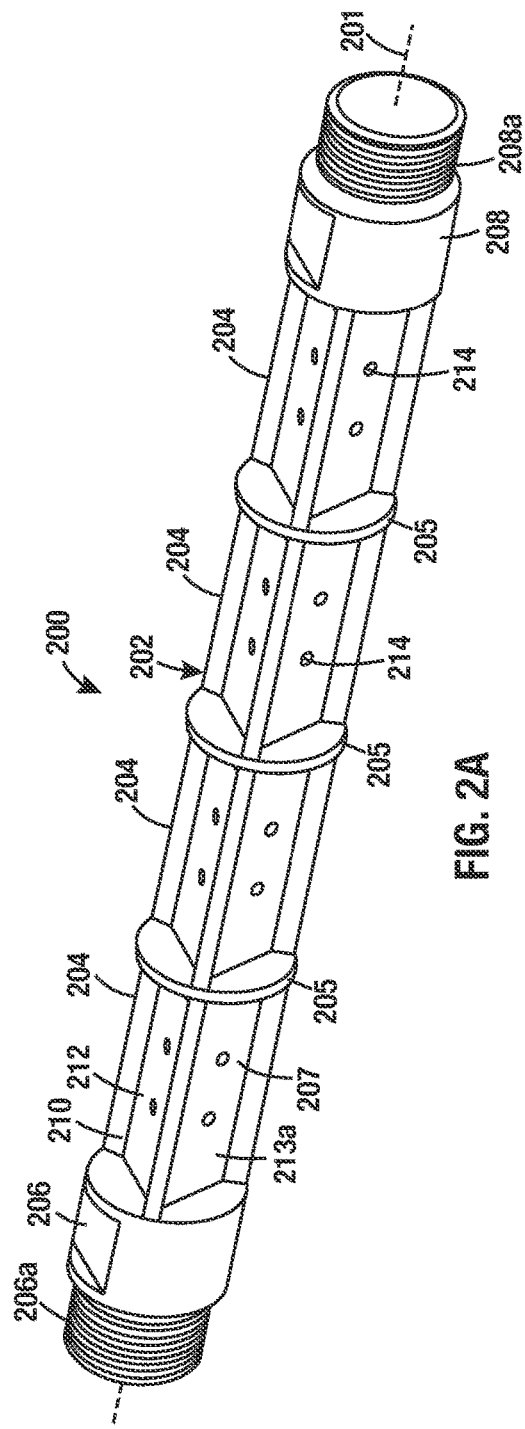
FIG. 2A is a perspective of a downhole coupon holder configured to hold coupons with flat back surfaces.

FIG. 2A shows a downhole coupon holder 200 according to one illustrative implementation. Downhole coupon holder 200 has a coupon holder axis 201. Coupon holder axis 201 will be aligned with a wellbore axis when downhole coupon holder 200 is deployed in a wellbore. Downhole coupon holder 200 includes one or more coupon holder units (CHUs) 204 arranged in series along coupon holder axis 201. Partition walls 205 may be disposed between adjacent CHUs 204. CHUs 204 and any intervening partition walls 205 are connected together to form an elongated body 202 that is axially aligned with coupon holder axis 201. In some cases, CHUs 204 and any intervening partition walls 205 may be integrally formed into a single piece. In the illustrated example, downhole coupon holder 200 includes four CHUs 204. In general, downhole coupon holder 200 may include one or more CHUs 204, e.g., one to six CHUs 204. The length of elongated body 202 may be a sum of the lengths of CHUs 204 measured along coupon holder axis 201 and the thicknesses of any partition walls 205 measured along coupon holder axis 201. In one example, the length of elongated body 202 may be anywhere from six inches to forty-eight inches. The diameter of elongated body 202 may be dictated by the largest diameter of CHUs 204, which in turn depends on the number and sizes of coupons to be supported by the CHU. In one example, the diameter of elongated body 202 may be in a range from 0.75 inches to 2.5 inches.

Downhole coupon holder 200 includes end connections 206, 208 that are disposed at opposite ends of elongated body 202. End connections 206, 208 may be integrally formed with, or otherwise attached to, CHUs 204 at opposite ends of elongated body 202. In one example, end connections 206, 208 include threaded surfaces 206a, 208a for forming threaded connections with other components. For example, a hanger may be coupled to downhole coupon holder 200 by threaded surface 206a to enable deployment of downhole coupon holder 200 into a wellbore on the end of the hanger. Similarly, a measurement tool, such as an electrical resistivity tool, may be coupled to downhole coupon holder 200 by threaded surface 208a to allow deployment of the measurement tool with the downhole coupon holder 200 into the wellbore. One example of forming downhole coupon holder 200 may include machining a rod made of a suitable material to form CHUs 204 and any intervening partition walls 205. End portions of the rod may be machined to form end connections 206, 208.

Figure 2B:
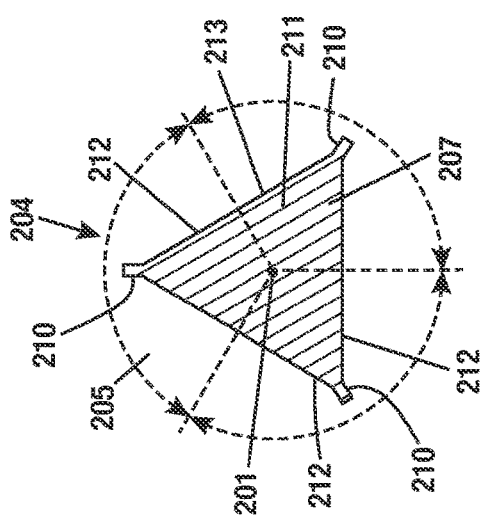
FIG. 2B is a cross-sectional view of one of the coupon holder units (CHUs) in the downhole coupon holder of FIG. 2A on a plane transverse to a coupon holder axis.

Referring to FIGS. 2A and 2B, each CHU 204 includes a coupon holder body 207 having an elongated core 211 (in FIG. 2B) and an external surface 213a circumscribing core 211. Elongated core 211 is axially aligned with coupon holder axis 201. External surface 213a has n sides, where the number n is greater than 1. In one example, n may range from two to eight, preferably from three to eight. The n sides have different radial orientations relative to coupon holder axis 201. Each of the n sides contains a slot 210. In the example shown in FIGS. 2A and 2B, each CHU 204 includes three (n=3) slots 210 corresponding to a three-sided CHU (the three sides are visible in FIG. 2B). However, as previously noted, n is not limited to three, and CHU 204 may have more than three slots or less than three slots. Assuming that each slot 210 carries at least one coupon, then the number of slots 210 in each CHU 204 will define the holding capacity of the CHU. In a downhole coupon holder with multiple CHUs 204, such as illustrated in FIG. 2A, CHUs 204 may have the same or different coupon holding capacities.

Each slot 210 has a base wall providing a coupon mounting surface 212. In the example of FIG. 2A, each CHU 204 includes three slots 210 and three corresponding coupon mounting surfaces 212 (the three slots are visible in FIG. 2B). In each CHU 204, coupon mounting surfaces 212 formed in adjacent slots 210 are angularly offset from each other. In other words, coupon mounting surfaces 212 formed in adjacent slots 210 of a CHU are not on the same plane. In one example, coupon mounting surfaces 212 formed in adjacent slots 210 of a CHU may be angularly offset from each other by 360/n degrees, where n is the number of coupon mating surfaces in the CHU, which may mean that the coupon mounting surfaces are evenly distributed about a circumference of coupon holder body 207. In some cases, there may be an alternating arrangement of coupon mounting surfaces on an external surface of a CHU, such as a wide coupon mounting surface followed by a narrow coupon mounting surface. In this case, even distribution about a circumference of the coupon holder body may be local to each size represented in the coupon mounting surfaces, e.g., the wide coupon mounting surfaces are evenly distributed about the coupon holder body, and the narrow coupon mounting surfaces are evenly distributed about the coupon holder body. FIG. 2A shows an example of three coupon mounting surfaces 212 formed in external surface 213 of coupon holder body 207 and angularly offset from each other by 120 degrees. The angular offsets are indicated by the circular arrows in FIG. 2B. However, this example is not intended to be limiting since there could be more or less than three coupon mounting surfaces per CHU.

Returning to FIG. 2A, coupon mounting surfaces 212 are shown as planar surfaces and have rectangular shapes. Coupon mounting surfaces 212 with these features can mate with coupons having a flat back surface, such as the coupons shown in FIGS. 1A to 1C. Fastener holes 214 are formed in coupon mounting surfaces 212. These holes extend to some depth within elongated core 211 (in FIG. 2B). These holes help register coupons on coupon mounting surfaces 212 as well as receive fasteners to secure the coupons to coupon holder body 207. The size of each slot 210 will be dictated by the size of the coupon to be arranged in the slot, or vice versa. In one example, the sizes of slots 210 in any one CHU 204 are the same such that coupons having the same size can be supported in the CHU. In addition, all the coupon mounting surfaces 212 in any one CHU 204 are aligned circumferentially about elongated core 211 (in FIG. 2B) such that they have the same axial position along coupon holder axis 201. For the purpose of determining whether coupon mating surfaces 212 have the same axial position on coupon holder axis 201, the geometric centers of the coupon mounting surfaces 212 may be used as a reference. When the geometric centers of coupon mating surfaces 212 in a CHU have the same axial position on coupon holder axis 201, the coupon mating surfaces may be considered to have the same axial position along coupon holder axis 201. Another way of expressing this is that a polygon having vertices at geometric centers of the coupon mounting surfaces 212 will lie in a plane that is orthogonal to coupon holder axis 201. One of the benefit of this arrangement is that when the downhole coupon holder is disposed in a wellbore, all the coupon mounting surfaces 212 in any one CHU 204 will be at the same depth within the wellbore and will experience the same flow conditions within the wellbore.

Figure 2C:
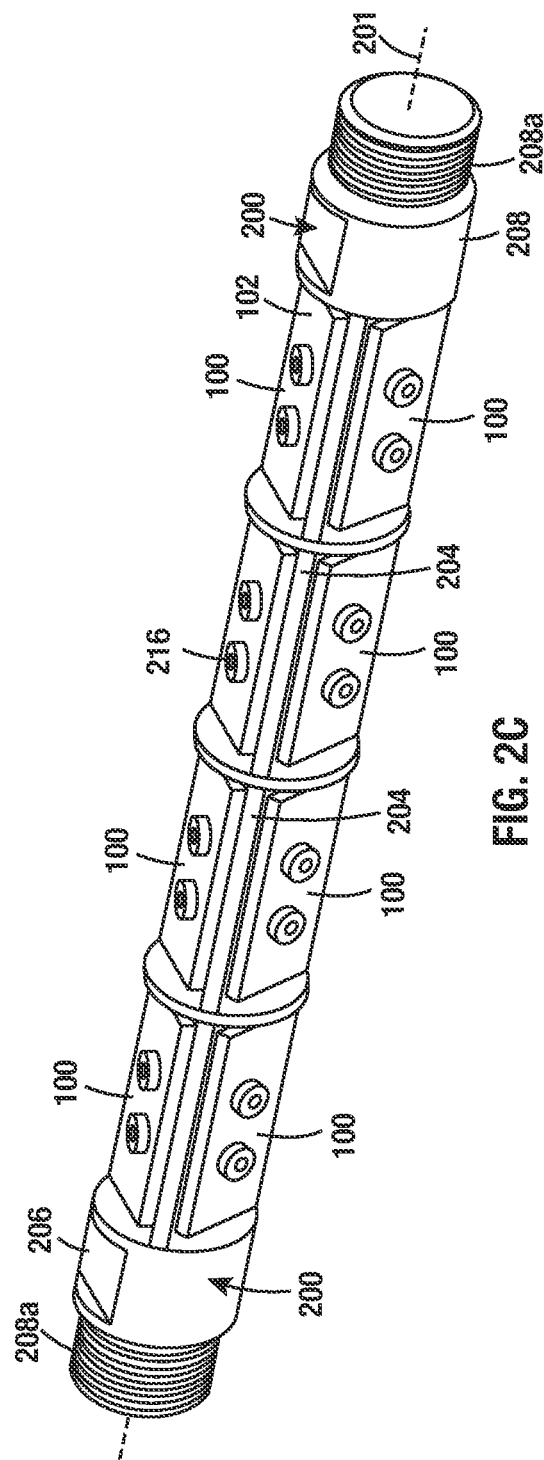
FIG. 2C is a perspective view of a coupon assembly formed with the downhole coupon holder of FIG. 2A.

Any of the coupon shapes with flat back surfaces may be mounted in the slots of CHUs 204 to form a coupon assembly. For illustrative purposes, FIG. 2C shows a coupon assembly including rectangular coupons 100 (previously shown in FIG. 1A) mounted in the slots (210 in FIG. 2A) of CHUs 204 in downhole coupon holder 200. The back surfaces (104 in FIG. 1A) of coupons 100 are in mating contact with the coupon mating surfaces (212 in FIG. 2A) of CHUs 204. Front surfaces 102 of coupons 100 are exposed for testing. Coupons 100 may be secured to the coupon support bodies (207 in FIG. 2A) by fasteners 216 inserted through aligned fastener holes in the coupons and coupon mating surfaces. Fasteners with flatter heads than shown for fasteners 216 in FIG. 2C, e.g., flat head screws, may be used to minimize hydrodynamic flow disturbance around the coupons.

Coupons 100 and/or the slots (210 in FIG. 2A) of CHUs 204 may be sized such that there are no substantial air gaps between the edge surfaces (106 in FIG. 1A) of coupons 100 and the side walls of the CHU slots (210 in FIG. 2A). In addition, the edge surfaces of coupons 100 may be coated with a non-metallic material, such as a fluoropolymer, e.g., Xylan fluoropolymer, to close any air gaps between the edges surfaces of the coupons and the side walls of the CHU slots due to manufacturing tolerances and to prevent galling between metal parts. The material of coupons 100 will depend on the desired coupon test. In some cases, it may be useful to have each CHU 204 contain the same type of coupons. In the example of FIG. 2C, each CHU 204 holds three coupons, and there are four CHUs for a total of twelve coupons. If each CHU has a length of about six inches, this would be twelve coupons in an elongated body with a length of about two feet.

Figure 3A:
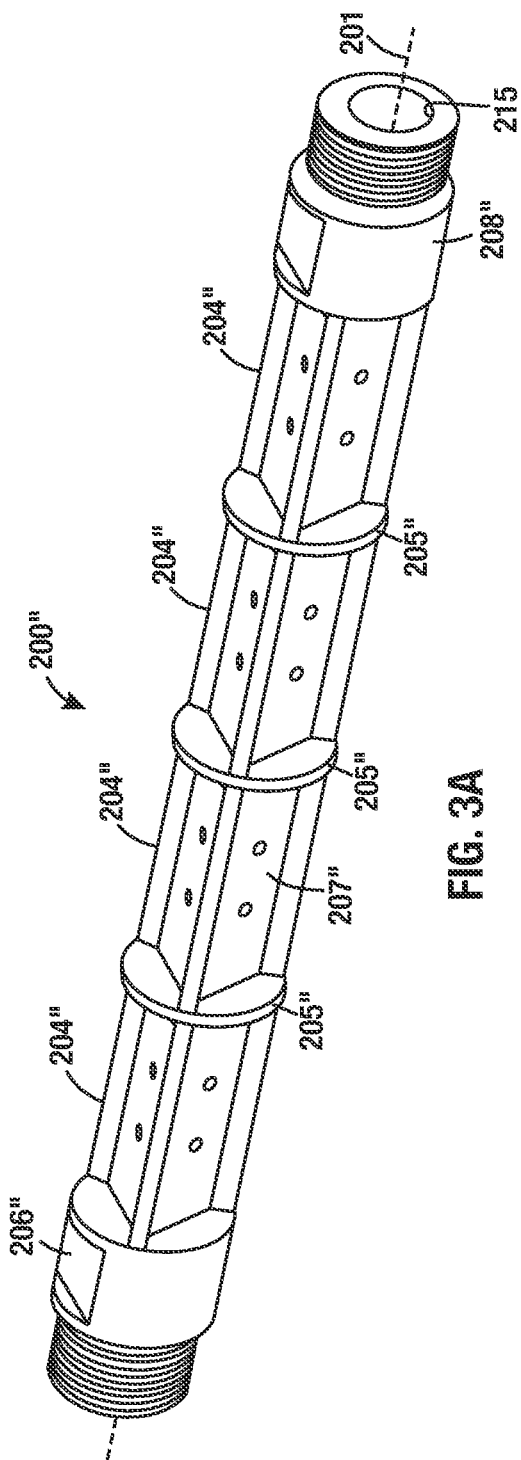
FIG. 3A is a perspective view of a downhole coupon holder with an axial bore.
Figure 3B:
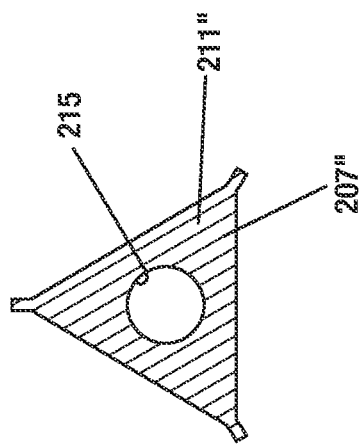
FIG. 3B is a cross-sectional view of one of the CHUs in the downhole coupon holder of FIG. 3B on a plane transverse to a coupon holder axis.

Downhole coupon holder 200 may be modified to include a central passage for fluid flow. As illustrated in FIGS. 3A and 3B, downhole coupon holder 200" may include an axial bore 215 extending along coupon holder axis 201 and through each of elongated cores 211" of coupon holder bodies 207", partition walls 205", and end connections 206", 208". Comparing FIG. 3B to FIG. 2B, core 211 in FIG. 2B is a solid core, whereas core 211" in FIG. 3B with a portion of bore 215 is a hollow core. Other than the axial bore 215 in downhole coupon holder 200", downhole coupon holder 200" is identical to the downhole coupon holder described with reference to FIGS. 2A and 2B.

Figure 4C:
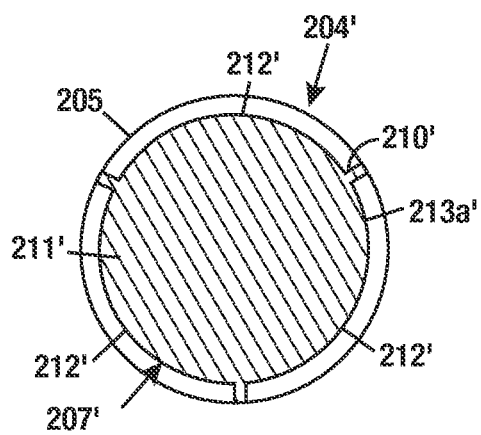
FIG. 4C is a cross-sectional view of a CHU in the downhole coupon holder of FIGS. 4A and 4B on a plane transverse to a coupon holder axis.

Downhole coupon holder 200 may be modified to hold curved coupons and mixed types of coupons. As illustrated in FIG. 4A, downhole coupon holder 200' includes one or more CHUs 204 and one or more CHUs 204' arranged in series and aligned axially to form an elongated body 202'. Partition walls 205 may be disposed between adjacent CHUs 204, 204'. CHUs 204, 204' and any intervening partition walls 205 may be integrally formed. End connections 206, 208 are disposed at opposite ends of elongated body 202'. CHUs 204, partition walls 205, and end connections 206, 208 are as described for the downhole coupon holder in FIG. 2A. Each CHU 204' includes a coupon holder body 207'. Coupon holder body 207' has an elongated core 211' and an external surface 213a' circumscribing core 211'. Elongated core 211' is axially aligned with coupon holder axis 201 and has n sides, where n is greater than 1. The n sides have different radial orientations relative to coupon holder axis 201. As shown more clearly in FIG. 4C, each of the n sides contains a slot 210'. Thus, CHU 204' is structurally similar to CHU 204, with the exception that the base wall of slot 210' provides a curved coupon mounting surface 212'. For illustrative purposes, rectangular coupons 100 are arranged in CHUs 204 as previously described with reference to FIG. 2C. In an alternative example, plano-curved coupons 100' in FIG. 1B may be arranged in CHUs 204. Curved coupons 120 are arranged in CHUs 204'. In FIG. 4A, some slots 210' in CHUs 204' are deliberately left without curved coupons 120 to allow the coupon mounting surfaces 212' of the CHUs to be visible. FIG. 4B shows the full coupon assembly with all the slots in CHUs 204' occupied by curved coupons 120.

Figure 4D:
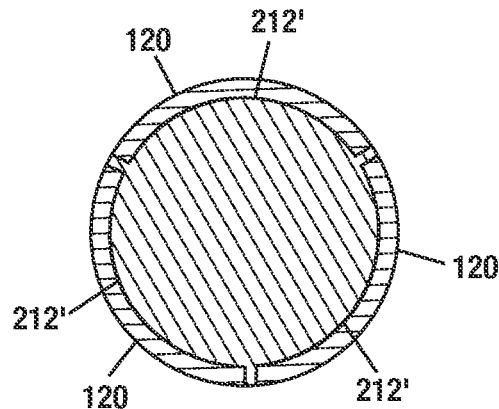
FIG. 4D is a cross-sectional view of the coupon assembly of FIG. 4B on a plane passing through a CHU configured to hold coupons with curved back surfaces.

In FIGS. 4A and 4B, CHUs 204, 204' hold their respective coupons 100, 120 such that the front surfaces 102, 122 of the coupons are exposed for testing. The back surfaces of the coupons mate with the coupon mounting surfaces. Coupons 100, 120 are secured to the coupon holder bodies of the respective CHUs 204, 204' by fasteners 216, 216'. In the illustrated example, each of CHUs 204, 204' is capable of holding three coupons (see the three coupon mounting surfaces 212 for CHU 204 in FIG. 2B and the three coupon mounting surfaces 212' for CHU 204' in FIGS. 4C and 4D). However, each of CHUs 204, 204' could have more than three coupon mounting surfaces/slots to hold more than three coupons. Moreover, the number of coupon mounting surfaces/slots in CHU 204 could be different from the number of coupon mounting surfaces/slots in CHU 204', i.e., CHU 204 and CHU 204' could have different coupon holding capacities. As in previous examples, the coupons and the slots that hold the coupons may be sized such that there are substantially no gaps between the edge surfaces of the coupons and the sidewalls of the slots that hold the coupons. If needed, gaps may be filled with a non-metallic material, as previously described.

Figure 5A:
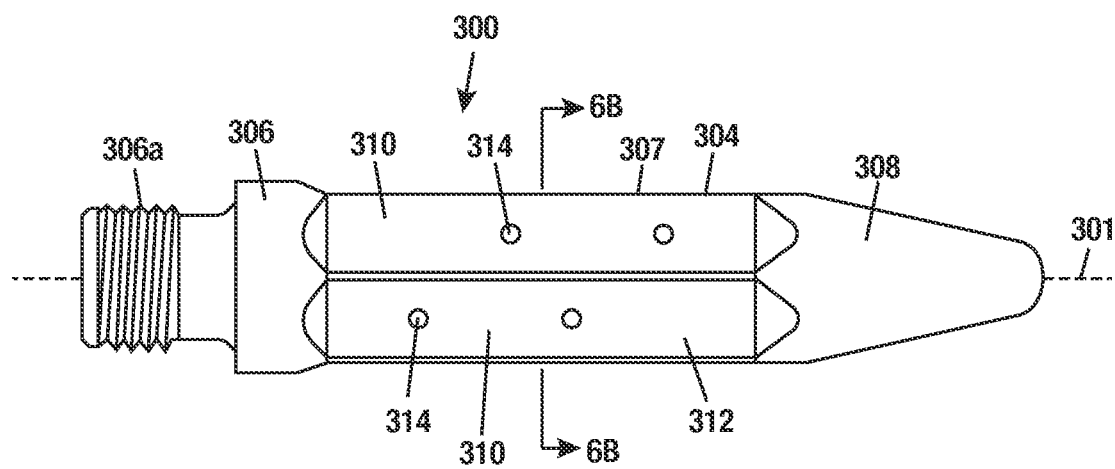
FIG. 5A is an elevated view of a downhole coupon holder configured to hold coupons with flat back surfaces in a compact body.

FIG. 5A shows a downhole coupon holder 300 according to another illustrative implementation. Downhole coupon holder 300 has a coupon holder axis 301. Coupon holder axis 301 will be aligned with a wellbore axis when downhole coupon holder 300 is deployed in a wellbore. Downhole coupon holder 300 includes a CHU 304, an end connection 306 attached to one end of CHU 304, and a bull nose fitting 308 attached to the other end of CHU 304. Bull nose fitting 308 is an end fitting with a bull nose shape. End connection 306 has a threaded surface 306a for making up a threaded connection with other components. For example, a hanger may be coupled to downhole coupon holder 300 by threaded surface 306a to enable deployment of downhole coupon holder 300 into a wellbore on the end of the hanger. Bull nose fitting 308 may serve to protect CHU 304 from direct impact with a surface, e.g., when deploying downhole coupon holder 300 into the wellbore. In some cases, bull nose fitting 308 may serve as an interface for connection to other components, such as a downhole tool. End connection 306 and bull nose fitting 308 may be integrally formed with, or otherwise attached to, opposite ends of CHU 304. One example of forming downhole coupon holder 300 may include machining a rod made of a suitable material to form CHU 304. End portions of the rod may be machined to form end connection 306 and bull nose fitting 308.

Figure 5B:
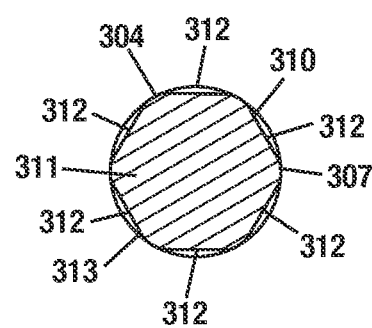
FIG. 5B is a cross-sectional view of FIG. 5A along line 5B-5B.

CHU 304 includes a coupon holder body 307 having an elongated core 311 and an external surface 313 circumscribing elongated core 311. Elongated core 311 is axially aligned with coupon holder axis 301. External surface 313 has n facets 310, where the number n is greater than 1. In one example, n may range from two to eight. The n facets have different radial orientations relative to coupon holder axis 301. In the example shown in FIG. 5A, external surface 313 includes six facets 310 corresponding to a six-sided CHU (the six facets are visible in FIG. 5B). Each facet 310 provides a coupon mounting surfaces 312. Adjacent coupon mounting surfaces 312 are angularly offset from each other since facets 310 are on different planes. In one example, adjacent coupon mounting surfaces 312 may be angularly offset from each other by an angle 360/n, where n is the number of facets. The sizes of coupon mounting surfaces 312 may be the same or different. In one implementation, coupon mounting surfaces 312 are aligned circumferentially about elongated core 311 such that they have the same axial position along coupon holder axis 301. For the purpose of determining whether coupon mounting surfaces 312 have the same axial position on coupon holder axis 201, the geometric centers of the coupon mounting surfaces 312 may be used as a reference. When the geometric centers of coupon mounting surfaces 312 have the same axial position on coupon holder axis 301, coupon mounting surfaces 312 may be considered to have the same axial position along coupon holder axis 301. Fastener holes 314 are formed in coupon mounting surfaces 312. Fastener holes 314 are useful for securing coupons to coupon mounting surfaces 312 and may aid in mounting coupons such that they are circumferentially aligned about elongated core 311.

Figure 5C:
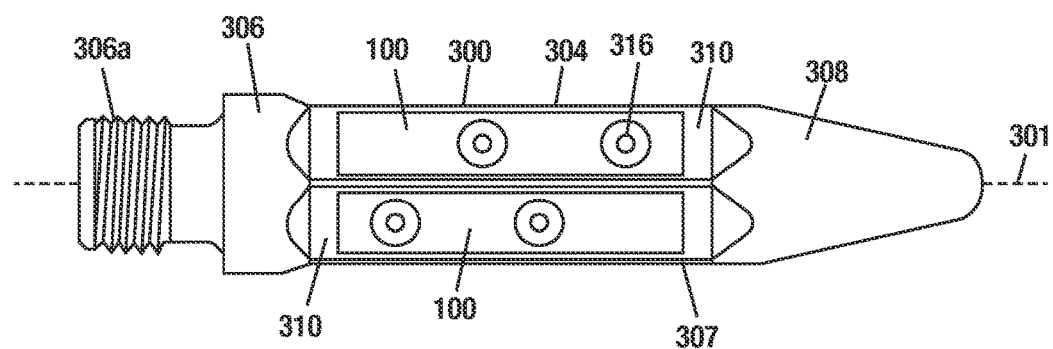
FIG. 5C is an elevated view of a coupon assembly formed with the downhole coupon holder of FIGS. 5A and 5B.

Any of the coupon shapes with flat back surfaces may be mounted on coupon mounting surfaces 312 to form a coupon assembly. For illustrative purposes, FIG. 5C shows rectangular coupons 100 (previously shown in FIG. 1A) mounted on coupon mounting surfaces 312, with the back surfaces of the coupons mate with coupon mounting surfaces 312. Front surfaces 102 of the coupons are exposed for testing. Coupons 100 may be secured in place by fasteners 316. Coupons 100 have the same axial position along coupon holder axis 301 when attached correctly to coupon holder body 307. Downhole coupon holder 300 provides a compact form that can be six inches or less in length while carrying a significant number of coupons, e.g., up to eight coupons.

Figure 5D:
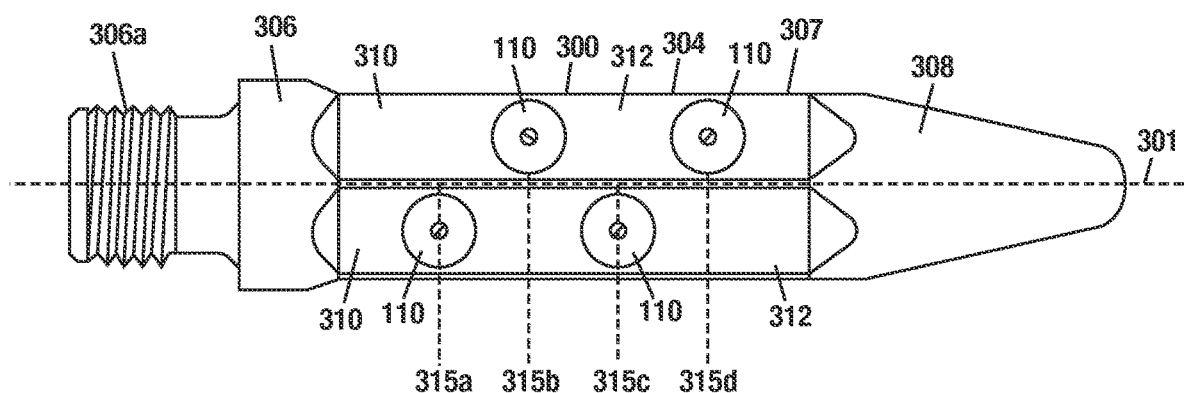
FIG. 5D is an elevated view of another coupon assembly formed with the downhole coupon holder of FIGS. 5A and 5B.

For illustrative purposes, FIG. 5D shows disk coupons 110 (previously shown in FIG. 1C) mounted on coupon mounting surfaces 312, with the back surfaces of the coupons in mating contact with coupon mounting surfaces 312 and the front surfaces 112 of the coupons exposed for testing. FIG. 5D illustrates the possibility of having several sets of circumferentially aligned coupons within a CHU. For example, coupons 110 in this illustration are staggered to provide several sets of coupons, each set having the same axial position along coupon holder axis 301. For example, four axial positions 315a, 315b, 315c, 315d are indicated in FIG. 5D. There will be a plurality of coupons at each axial position. For example, if there are six coupon mounting surfaces 312 positioned about the core of coupon holder body 307, and each adjacent pair of coupon mounting surfaces 312 holds coupons as shown in FIG. 5D, then there will be three coupons at each of the axial positions 315a, 315b, 315c, 315d.

Figure 6A:
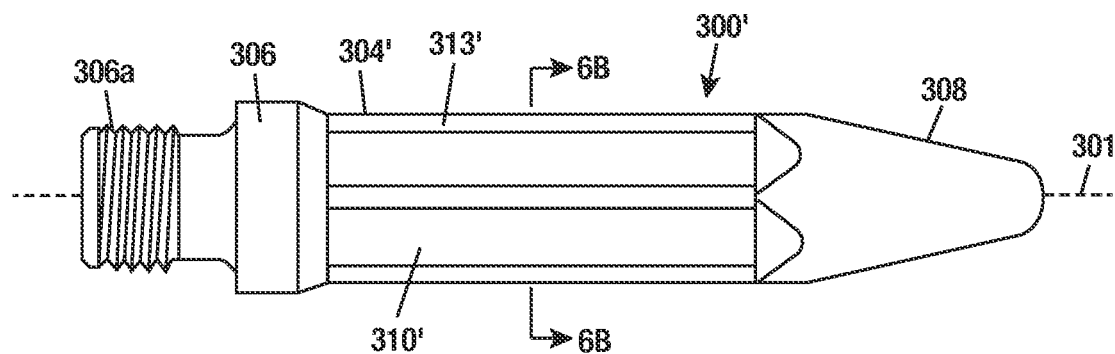
FIG. 6A is an elevated view of a downhole coupon holder configured to hold coupons with curved back surfaces in a compact body.
Figure 6B:
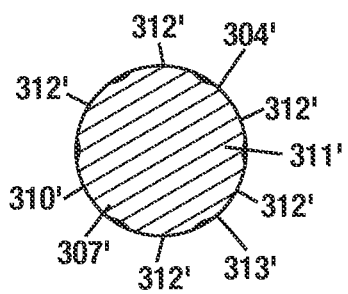
FIG. 6B is a cross-sectional view of FIG. 6A along line 6B-6B.
Figure 6C:
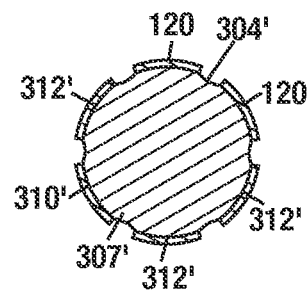
FIG. 6C shows curved coupons mounted on the curved facets of the downhole coupon holder of FIGS. 6A and 6B.
Figure 6D:
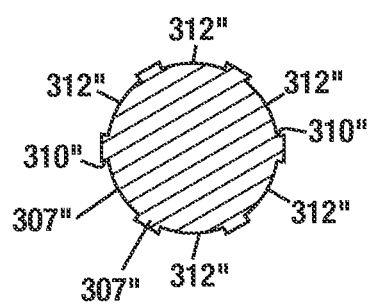
FIG. 6D is a cross-sectional view corresponding to FIG. 6B and shows slots with curved base walls to hold coupons with curved back surfaces.
Figure 6E:
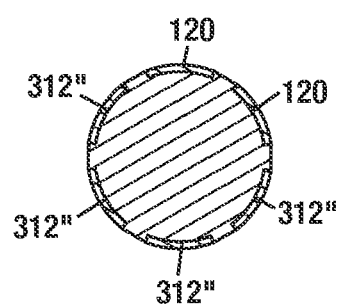
FIG. 6E shows curved coupons mounted in the slots shown in FIG. 6D.

Downhole coupon holder 300 may be modified to hold curved coupons. As illustrated in FIGS. 6A and 6B, downhole coupon holder 300' includes CHU 304', end connection 306, and bull nose fitting 308. End connection 306 and bull nose fitting 308 are as described for the downhole coupon holder in FIGS. 5A-5D. CHU 304' includes a coupon holder body 307' having an elongated core 311' and an external surface 313' circumscribing core 311'. External surface 313' has n curved facets 310', where the number n is greater than 1. In one example, n may range from two to eight. In the example shown in FIGS. 6A and 6B, CHU 304' has six curved facets 310' (seen more clearly in FIG. 6B), each of which provides a coupon mounting surface 312'. Coupon mounting surfaces 312' are aligned circumferentially about core 311' such that they have the same axial position along coupon holder axis 301. The main difference between CHU 304' and previously described CHU 304 (in FIGS. 5A-5D) is that the curved facets 310' of CHU 304' provide curved coupon mounting surfaces 312'. In comparison, the facets 310 (in FIGS. 5A-5D) of CHU 304 provide planar coupon mounting surfaces 312 (in FIGS. 5A-5D). As shown in FIG. 6C, curved coupons 120 can be mounted on curved coupon mounting surfaces 312'. FIG. 6D shows an alternative coupon holder body 307" where slots 310" with curved base walls are formed instead of curved facets. The curved base walls provide curved coupon mounting surfaces 312" in the same manner as curved facets 310'. FIG. 6E shows curved coupons 120 mounted in slots 310" and in mating contact with curved coupon mounting surfaces 312". Coupon holder body 307" shown in FIGS. 6D and 6E may be used instead of coupon holder body 307' shown in FIGS. 6B and 6C in the downhole coupon holder of FIG. 6A.

In one example, the various components of the downhole coupon holders (200, 200', 300, 300') illustrated in FIGS. 2A to 6E, e.g., the coupon holder bodies (207, 307), the partition walls (205), the end connections (206, 208, 306), and the bull nose fittings (308), may be made of a corrosion-resistant metal or alloy, such as Grade 17-4 Stainless Steel (UNS S17400) or other metallic material that will not corrode when disposed in a wellbore that is undergoing production or treatment. To use the downhole coupon holders in a wellbore environment, the threaded surfaces (206a, 208a, 306a) of the end connections may be coated with an anti-galling agent, such as high purity Goop, and/or high temperature silicone grease that will not be destroyed by the application of torque and that is resistant to corrosion in the wellbore environment.

The downhole coupon holders illustrated in FIGS. 2A to 6E are of the type where the coupon mounting surfaces are intended to be in mating contact with the back surfaces of coupons. In these holders, the coupon mounting surfaces are shaped to match the back surfaces of the target coupons. When coupon assemblies built with the downhole coupon holders of FIGS. 2A to 6E are deployed into a wellbore, the back surfaces of the coupons will not be exposed directly to fluids in the wellbore environment. FIGS. 7A through 12C relate to downhole coupon holders that allow all sides of the coupon to be fully exposed to fluids in a wellbore environment. This is achieved by end-mounting of the coupons around a common core and providing spaces around the coupons for movement of fluid.

FIGS. 7A and 7B show a downhole coupon holder 400 according to another illustrative implementation. Downhole coupon holder 400 has a coupon holder axis 401. Downhole coupon holder 400 includes an elongated support structure 406 that is axially aligned with coupon holder axis 401, which means that the axial axis of elongated support structure 406 coincides with coupon holder axis 401. In one example, elongated support structure 406 is a cylindrical tube. Downhole coupon holder 400 includes a coupon holder housing 403, which may be axially aligned with coupon holder axis 401. Coupon holder housing 403 is mounted on an end portion 406a of elongated support structure 406, or end portion 406a is inserted into a bore 405 of coupon holder housing 403. In an enlarged portion of bore 405, an annular cavity 409 is formed. Annular cavity 409 is situated between an inner surface of coupon holder housing 403 and an outer surface of end portion 406a of elongated support structure 406. A coupon holder body 407 is disposed in annular cavity 409. Coupon holder housing 403 may have a threaded surface 404 for making a threaded connection with other components.

Coupon holder body 407 may be axially aligned with coupon holder axis 401. Annular cavity 409 is disposed adjacent to an end 403b of coupon holder housing 403, allowing coupon holder body 407 to be accessible from end 403b. Coupon holder body 407 is in the form of a ring having a central opening 410. End portion 406a of elongated support structure 406 extends through central opening 410 into bore 405 of coupon holder housing 403. Coupon holder body 407 includes slots 412 to receive end portions of coupons. In one example, slots 412 are cylindrical slots to receive end portions of cylindrical rod coupons. The open ends of slots 412 through which end portions of coupons are received are located at an end face 413 of coupon holder body 407. End face 413 is in a plane transverse to coupon holder axis 401. The open ends of slots 412 at end face 413 are arranged in a circular pattern around central opening 410 and around coupon holder axis 401 (shown more clearly in FIG. 7C). Slots 412 extend in the same direction as coupon holder axis 401 such that coupons having end portions inserted into slots 412 extend parallel to elongated support structure 406.

Figure 8A:
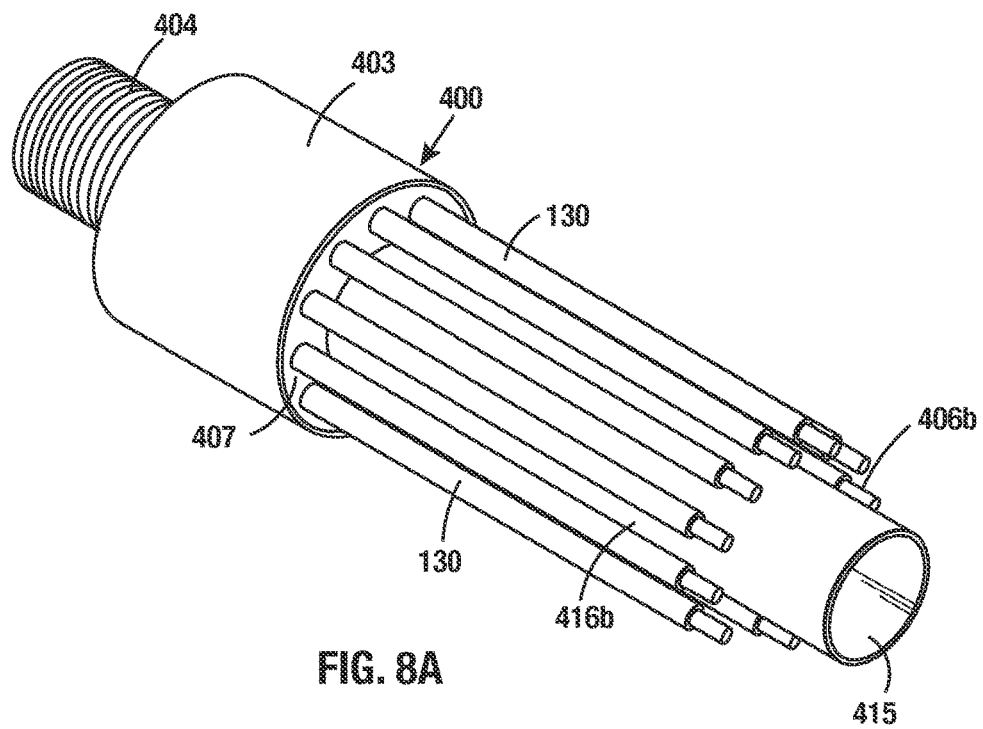
FIG. 8A is a perspective view of a coupon assembly formed with the downhole coupon holder of FIGS. 7A-7C.
Figure 8B:
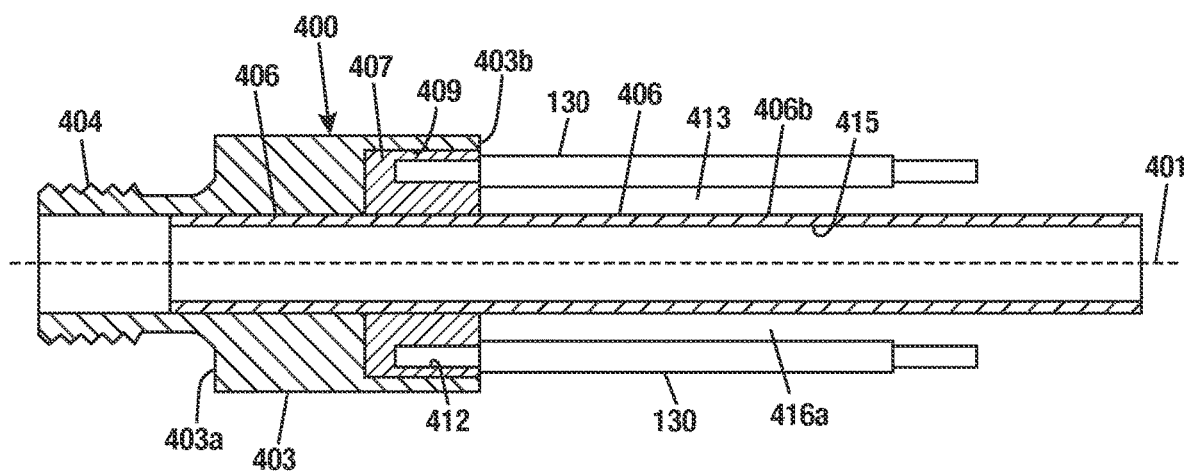
FIG. 8B is a cross-sectional view of the coupon assembly of FIG. 8A.

Coupons may be mounted in slots 412 to form a coupon assembly. As shown in FIGS. 8A and 8B, when end portions of cylindrical rod coupons 130 (previously shown in FIG. 1E) are disposed in slots 412, cylindrical rod coupons 130 will extend in the same direction as elongated support structure 406 and will form a pattern circumscribing portion 406b of support structure 406 that extends outside of coupon holder housing 403. Elongated support structure 406 provides structural stability to coupons 130. When support structure 406 is a tube having bore 415, support structure 406 also serves as a fluid conduit. As shown more clearly in FIG. 8B, the positioning of slots 412 relative to elongated support structure 406 is such that there are spaces 416a between the outer surface of elongated support structure 406 and coupons 130. Also, the spacing between slots 412 along the circular pattern results in spaces (indicated at 416b in FIG. 8A) between adjacent rod coupons 130 along the length of elongated support structure 406. Spaces 416a, 416b are connected and form flow paths around rod coupons 130, allowing rod coupons 130 to be fully exposed to wellbore fluids when deployed in a wellbore environment with downhole coupon holder 400.

Figure 9A:
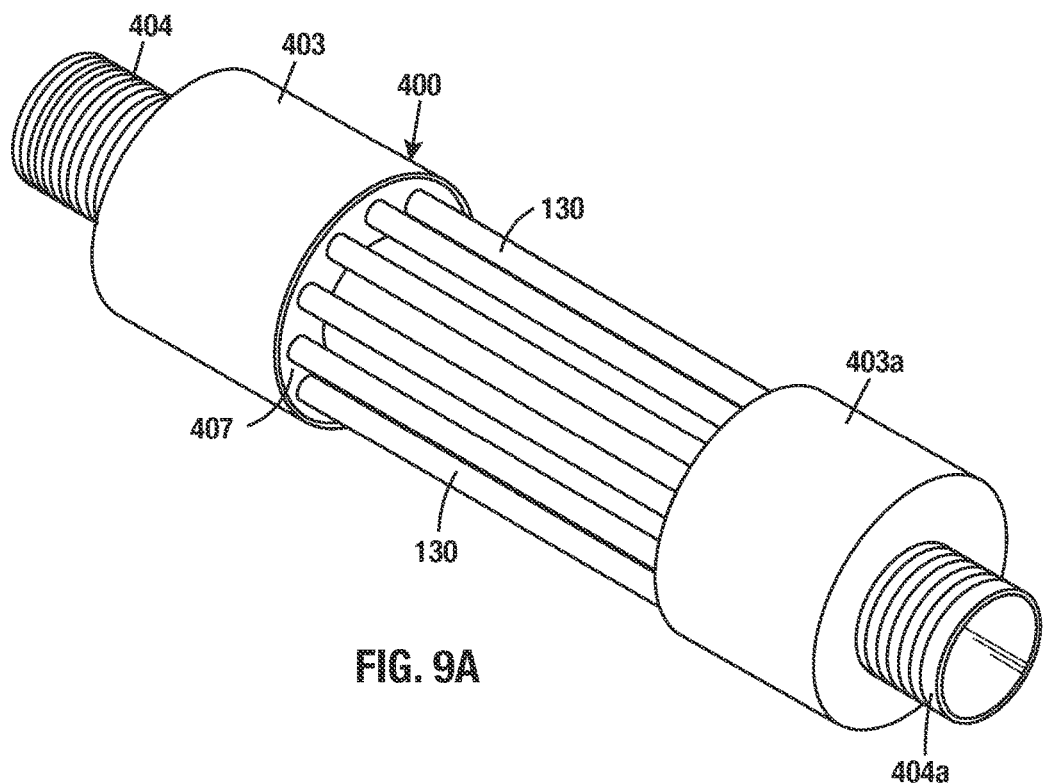
FIG. 9A is a perspective of a coupon assembly including coupons mounted between two coupon holder bodies of a downhole coupon holder.
Figure 9B:
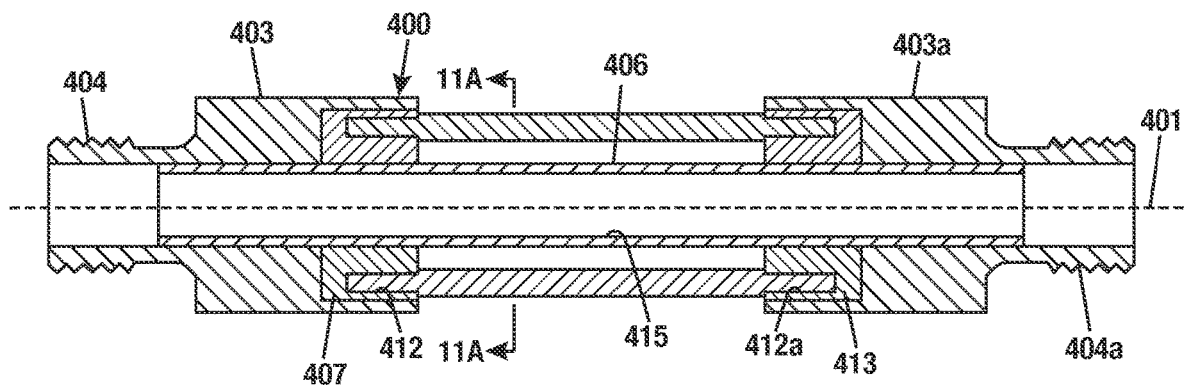
FIG. 9B is a cross-sectional view of the coupon assembly of FIG. 9A.

FIGS. 9A and 9B show that downhole coupon holder 400 may include an additional coupon holder housing 403a and coupon holder body 407a. Coupon holder housing 403a and coupon holder body 407a may have the same structures described for coupon holder housing 403 and coupon holder body 407, respectively. Coupon holder housing 403a may include a threaded surface 404a for making a threaded connection with other components. In this implementation, one end portion of elongated support structure 406 is inserted into coupon holder housing 406, and the other end portion of elongated support structure 406 is inserted into coupon holder housing 406a. Coupon holder body 407 is disposed in an annular cavity inside coupon holder housing 406 as previously described. Coupon holder body 407a is similarly disposed in an annular cavity inside coupon holder housing 403a. Each of coupon holder bodies 407, 407a have slots 412, 412a to receive end portions of coupons. This arrangement secures coupons 130 between coupon holder bodies 407, 407a.

Figure 10A:
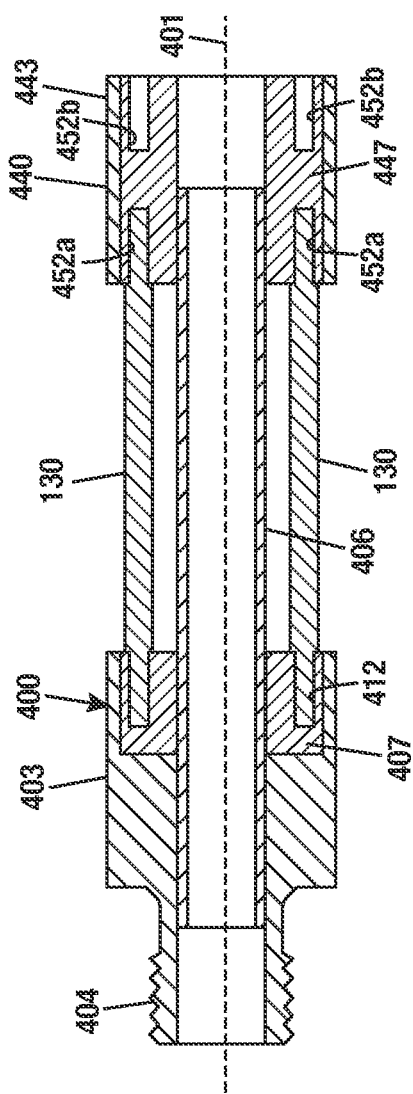
FIG. 10A is a cross-sectional view of a coupon assembly including coupons mounted between two coupon holder bodies of a downhole coupon holder having an adapter to extend the holding capacity of the holder.

FIG. 10A shows that downhole coupon holder 400 may include an adapter 440 to enable extension of the holding capacity of the coupon holder. Adapter 440 may include a sleeve 443 and a coupon holder body 447 mounted inside sleeve 443. Coupon holder body 447 has slots 452a, 452b on opposite sides to receive end portions of coupons. In FIG. 10A, elongated support structure 406 has one end inserted through coupon holder body 407 into the bore of coupon holder housing 403, as previously described. The other end of support structure 406 is received inside coupon holder body 447 of adapter 440. End portions of coupons 130 are mounted in slots 412 of coupon holder body 407 and slots 452a of adapter 440. Coupons 130 extend parallel to elongated support structure 406. The pattern of slots 452a in coupon holder body 447 matches the pattern of slots 412 in coupon holder body 407 to enable coupons to be arranged between coupon holder bodies 407, 447 as shown.

Figure 10B:
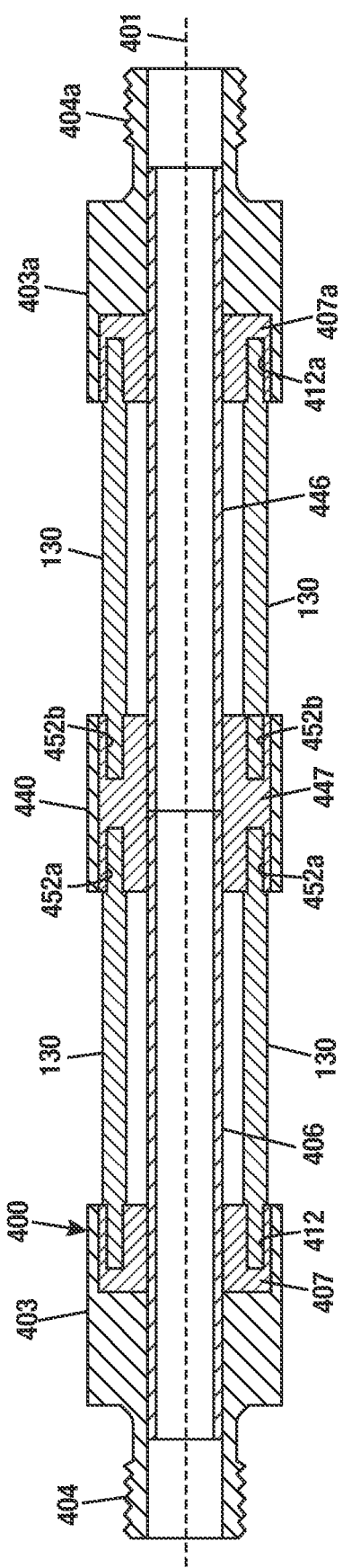
FIG. 10B is a cross-sectional view of a coupon assembly including two sets of coupons mounted in a downhole coupon holder having double coupon holding capacity.

FIG. 10B shows another elongated support structure 446 with one end received in coupon holder body 447 of adapter 440. The other end of support structure 446 is inserted through an opening at the center of coupon holder body 407a into the bore of coupon holder housing 403a. Elongated support structure 446 may be, for example, a cylindrical tube. End portions of a second set of coupons 130 are mounted in slots 452b of coupon holder body 447 and slots 412a of coupon holder body 407a. The second set of coupons 130 extends parallel to support structure 446. As in the previous example, the pattern of slots 452b matches the pattern of slots 412a to enable the second set of coupons to be mounted between coupon holder bodies 447, 407a as shown. In the example shown in FIG. 10B, adapter 440 allows doubling of the capacity of the downhole coupon holder. As many adapters as needed may be arranged in series to extend the holding capacity of the downhole coupon holder.

Figure 11A:
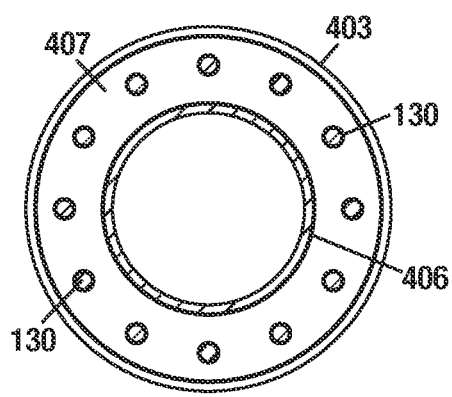
FIG. 11A is a cross-sectional view of a coupon assembly with cylindrical rod coupons.
Figure 11B:
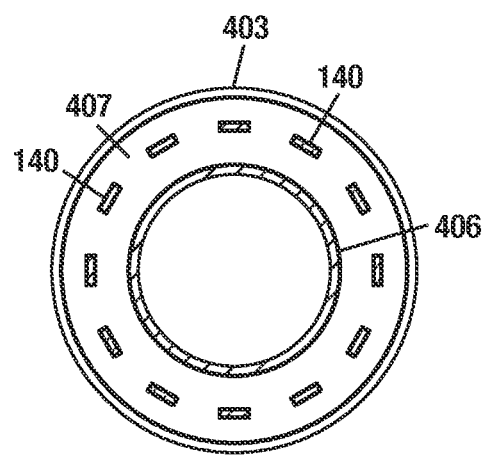
FIG. 11B is a cross-sectional view of a coupon assembly with flat rod coupons.
Figure 11C:
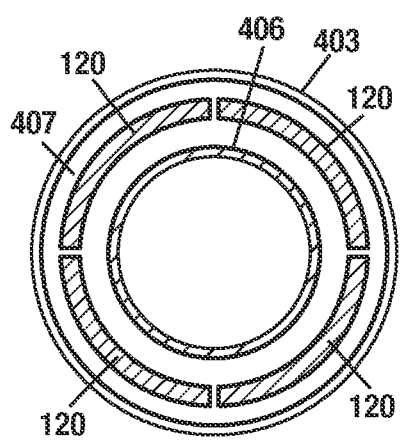
FIG. 11C is a cross-sectional view of a coupon assembly with curved coupons.
Figure 11D:
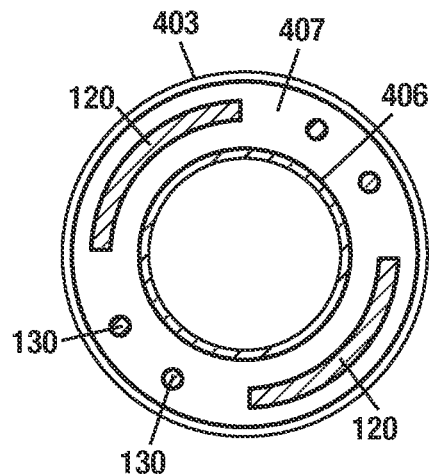
FIG. 11D is a cross-sectional view of a coupon assembly with curved coupons and cylindrical rod coupons.

Coupon holder bodies 407, 407a, 447 may be configured to support various arrangements of coupons. Examples of configuration of coupon holder 407 is shown in FIGS. 11A to 111D. These example configurations can be applied to any of the other coupon holder bodies described in FIGS. 9B, 10A, and 10B. For illustrative purposes, FIG. 11A shows coupon holder body 407 with cylindrical slots to receive end portions of cylindrical rod coupons 130. FIG. 11B shows coupon holder body 407 with flat-sided slots to receive end portions of flat rod coupons 140. FIG. 11C shows coupon holder body 407 with curved slots to receive end portions of curved coupons 120. FIG. 11D shows coupon holder body 407 with cylindrical slots to receive end portions of cylindrical rod coupons 130 and curved slots to receive curved coupons 120.

FIGS. 12A and 12B show a downhole coupon holder 500 according to another illustrative implementation. Downhole coupon holder 500 has a coupon holder axis 501. Downhole coupon holder 500 includes a coupon holder body 507, an end connection 504 attached to one end 507a of coupon holder body 507, and an elongated support structure 506 attached to another end 507b of coupon holder body 507. In one example, elongated support structure 506 is a cylindrical rod. End connection 504, coupon holder body 507, and elongated support structure 506 are axially aligned with coupon holder axis 501. End connection 504 includes a threaded surface 504a for making a threaded connection. The length of support structure 506 projecting from end 507b of coupon holder body 507 may be selected to be greater than the length of rod coupons 130 to be supported by the holder.

Coupon holder body 507 includes a central opening 505 (in FIG. 12C) to receive an end portion of elongated support structure 506. The end portion of support structure 506 may be retained in central opening 505 using any suitable method. Coupon holder body 507 includes slots 512 (in FIG. 12C) to receive end portions of rod coupons 130. As shown in FIG. 12C, slots 512 have open ends at an end face 513 of coupon holder body 507. End face 513 is on a plane transverse to coupon holder axis 501. In the illustrated example, slots 512 have a circular cross-section to receive end portions of cylindrical rod coupons. In alternative implementations where flat rod coupons are to be supported, slots 512 may have a rectangular cross-section. Similarly, if curved coupons are to be supported, slots 512 may have curved cross-sections. The open ends of slots 512 at end face 513 are arranged in a circular pattern around central opening 505 and around coupon holder axis 501. When end portions of rod coupons 130 are inserted into slots 512, rod coupons 130 will extend in the same direction as support structure 506 and will form a circular pattern circumscribing support structure 506.

To lock rod coupons 130 in place, spacer tubes 508 may be mounted on pins (139 in FIG. 1E) at the ends of rod coupons 130. Spacer tubes 508 are inserted into slots in a spacer connector 518. The slots in spacer connector 518, shown as 519 in FIG. 12D, can be similar in arrangement pattern to slots 512 in coupon holder body 507. Spacer connector 518 includes a threaded surface 518a for forming a threaded connection with a bull nose fitting 520. Spacer connector 518 also includes a bore for passage of a tip of support structure 506. The tip of support structure 506 includes a hole 521 (in FIG. 12B) to receive a fastener. Similar holes are in spacer connector 518 and bull nose fitting 520. These holes align when all the parts are assembled to receive a fastener. V-grooves 522, 524, 526 may be formed in outer surfaces of coupon holder body 507, spacer connector 518, and bull nose fitting 520 for passage of fluid around rod coupons 130. FIG. 12E shows that coupons 130 as assembled into coupon holder 500 are spaced from each other and from the support structure to allow fluid to move freely around the coupons.

In one example, the various components of the downhole coupon holders (400, 500) illustrated in FIGS. 7A to 12E that will be exposed to wellbore fluids, e.g., the coupon holder housings (403, 403a), the coupon holder bodies (407, 407a, 447, 507), the elongated support structures (406, 506), the end connection (504), the spacer tubes (508), the spacer connector (518), and the bull nose fitting (520), may be made of a corrosion-resistant metal or alloy, such as Grade 17-4 Stainless Steel (UNS S17400) or other metallic material that will not corrode when disposed in a wellbore that is undergoing production or treatment. To use the downhole coupon holders in a wellbore environment, the threaded surfaces (404, 404a, 504a) for making threaded connections may be coated with an anti-galling agent, such as high purity Goop, and/or high temperature silicone grease that will not be destroyed by the application of torque and that is resistant to corrosion in the wellbore environment.

The coupons mounted in the downhole coupon holders (200, 200', 300, 300', 400, 500) of FIGS. 2A to 12E can be any combination of corrosion coupons, erosion coupons, and scale coupons as previously described. For corrosion study with the downhole coupon holders (200, 200', 300, 300') of FIGS. 2A to 6E, the back surfaces of the coupons that will come into mating contact with the coupon mounting surfaces of the downhole coupon holders may be coated with a corrosion-resistant material such that only the front surfaces of the coupons will be allowed to corrode for accuracy of corrosion calculation. The corrosion-resistant material used on the surfaces of the coupon may be selected from polymeric, resin, epoxy, organic, powder, metallic, and nanocomposite coatings.

Figure 13:
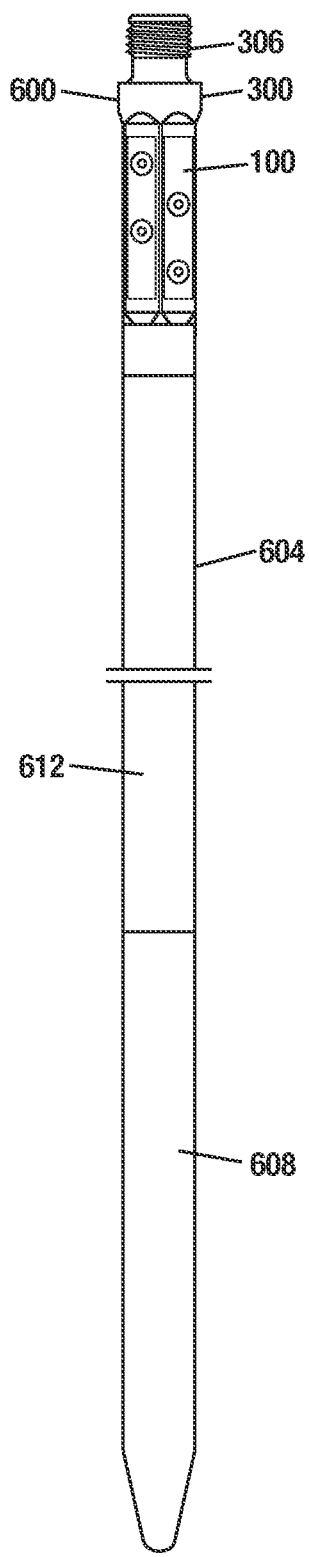
FIG. 13 is a schematic diagram showing a coupon assembly attached to a downhole tool.

Various coupon assemblies may be configured using the downhole coupon holders (200, 200', 300, 300', 400, 500) described in FIGS. 2A to 12E. These coupon assemblies may be deployed into a wellbore alone for coupon testing or attached to a downhole tool and then deployed into the wellbore with the downhole tool. For illustration purposes, FIG. 13 shows a coupon assembly 600 including coupons 100 fastened to downhole coupon holder 300. Coupon assembly 600 is fitted to an end of a downhole tool 604. A gauge hanger (not shown) may be attached to end connection 306 of downhole coupon holder 300 and deployed into a wellbore using a slickline. Once the gauge hanger is anchored in the wellbore, the slickline may be retrieved. Coupon assembly 600 and downhole tool 604 will remain in the wellbore, suspended at the end of the gauge hanger. Production can be carried out in the wellbore while coupon assembly 600 and downhole tool 604 are suspended in the wellbore. In one example, downhole tool 604 may be a downhole corrosion measurement tool including an electrical resistance probe 608 to measure metal loss due to corrosion. Downhole tool 604 may include an instrumentation module 612 to record the data from the probe. In the example downhole coupon holder 300, the front surfaces of coupons 100 will be exposed to wellbore fluids while the assembly is in the wellbore. Damage to the coupons can be accessed when the coupon assembly is retrieved to the surface.

The detailed description along with the summary and abstract are not intended to be exhaustive or to limit the embodiments to the precise forms described. Although specific embodiments, implementations, and examples are described herein for illustrative purposes, various equivalent modifications can be made without departing from the spirit and scope of the disclosure, as will be recognized by those skilled in the relevant art.

The invention claimed is:

1. An apparatus comprising:
   an elongated support structure axially aligned with a coupon holder axis;
   a coupon holder body positioned to have an end face in a plane transverse to the coupon holder axis, the coupon holder body having a plurality of slots disposed in a circular arrangement around the coupon holder axis, the plurality of slots having open ends on the end face, the plurality of slots to receive end portions of a plurality of coupons through the open ends and position the plurality of coupons in parallel to the coupon holder axis and around the elongated support structure, wherein the coupon holder body comprises a ring body having a central opening, and wherein the plurality of slots is disposed in a circular arrangement around the central opening; and
   a coupon holder housing having a bore, wherein the coupon holder body is disposed within an annular cavity formed within the bore, and wherein an end portion of the elongated support structure extends through the central opening in the coupon holder body into the bore.

2. The apparatus of claim 1, wherein the plurality of slots are selected from cylindrical slots to receive end portions of cylindrical rod coupons, flat-sided slots to receive end portions of flat rod coupons, and curved slots to receive end portions of curved coupons.

3. The apparatus of claim 1, wherein the plurality of slots have shapes to receive end portions of at least two different types of coupon shapes selected from flat rod coupon shape, cylindrical rod coupon shape, and curved coupon shape.

4. The apparatus of claim 1, further comprising an end connection coupled to one end of the coupon holder body and an end fitting coupled to one end of the elongated support structure, the end connection comprising a threaded surface for forming a threaded connection, the end fitting having a bull nose shape.

5. The apparatus of claim 1, further comprising a plurality of coupons having end portions mounted in the plurality of slots, the plurality of coupons positioned in parallel to the coupon holder axis and around the elongated support structure by the slots, the plurality of coupons selected from cylindrical rod coupons, flat rod coupons, and curved coupons.

* * * * *